(12) United States Patent
Pluta

(10) Patent No.: US 12,349,658 B2
(45) Date of Patent: Jul. 8, 2025

(54) ANIMAL RESTRAINING APPARATUS

(71) Applicant: Michael R. Pluta, Huntington Beach, CA (US)

(72) Inventor: Michael R. Pluta, Huntington Beach, CA (US)

(*) Notice: Subject to any disclaimer, the term of this patent is extended or adjusted under 35 U.S.C. 154(b) by 30 days.

(21) Appl. No.: 18/151,375

(22) Filed: Jan. 6, 2023

(65) Prior Publication Data
US 2024/0224942 A1     Jul. 11, 2024

(51) Int. Cl.
*A01K 27/00*     (2006.01)

(52) U.S. Cl.
CPC .......... *A01K 27/002* (2013.01); *A01K 27/003* (2013.01)

(58) Field of Classification Search
CPC ............................ A01K 27/002; A01K 27/003
See application file for complete search history.

(56) References Cited

U.S. PATENT DOCUMENTS

| | | | | |
|---|---|---|---|---|
| 1,685,435 A * | 9/1928 | Philbrick | ............... | A01K 15/04 119/818 |
| 2,670,712 A * | 3/1954 | Patience | ............... | A01K 27/002 119/856 |
| 3,769,939 A * | 11/1973 | Wais | ............... | A01K 15/04 119/819 |
| 5,383,426 A * | 1/1995 | Krauss | ............... | A01K 27/003 119/793 |
| 5,511,515 A * | 4/1996 | Brown | ............... | A01K 27/002 119/864 |
| 5,682,840 A * | 11/1997 | McFarland | ............... | A01K 27/002 119/856 |
| 6,708,650 B1 * | 3/2004 | Yates | ............... | A01K 27/002 119/818 |
| 7,165,511 B1 | 1/2007 | Brezinski | | |
| 7,284,504 B1 * | 10/2007 | Purschwitz, Jr. | ............... | A01K 1/0263 119/792 |
| 7,886,699 B2 | 2/2011 | Lady | | |
| 7,891,322 B2 | 2/2011 | Bennett | | |
| 7,963,256 B1 * | 6/2011 | Horgan | ............... | A01K 27/002 119/816 |
| 8,210,131 B2 | 7/2012 | Friedland | | |
| 8,281,748 B2 | 10/2012 | Elkins et al. | | |
| 8,516,978 B2 | 8/2013 | Horiuchi | | |
| 8,950,364 B1 | 2/2015 | Wamsat et al. | | |
| 9,089,110 B2 | 7/2015 | Lai | | |

(Continued)

*Primary Examiner* — Timothy D Collins
*Assistant Examiner* — Brittany A Lowery
(74) *Attorney, Agent, or Firm* — UltimatEdge IP Law Group, P.C.; Dean G. Stathakis

(57) ABSTRACT

The present specification provides an animal restraining apparatus comprising a foreleg constraining leash and a support strap comparing a loop connector, the loop connector configured to couple the foreleg constraining leash to the support strap in a manner that forms a foreleg humerus loop while allowing the foreleg constraining leash to freely slide through the loop connector to permit constriction or expansion of the foreleg humerus loop. Once donned on an animal, a handler simply applies minimal force on a leash connected to the leash end of the foreleg restraining leash in a manner that causes a reduction in loop size of the foreleg humerus loop around a foreleg of the animal. This reduction in loop size impedes the foreleg of the animal to freely move forward causing the animal to instinctually cease its movement.

16 Claims, 7 Drawing Sheets

(56) References Cited

U.S. PATENT DOCUMENTS

| | | |
|---|---|---|
| 9,480,240 B2 | 11/2016 | Sinko |
| 9,491,931 B2 | 11/2016 | Yamin |
| 10,130,076 B2 | 11/2018 | Yun |
| 10,154,653 B2 | 12/2018 | Soriano |
| 10,231,438 B2 | 3/2019 | Arnold |
| 10,238,091 B2 | 3/2019 | Hoffman |
| 10,334,825 B2 | 7/2019 | Vaccari |
| 10,390,518 B2 | 8/2019 | Yun |
| 10,631,523 B2 | 4/2020 | Sporn |
| 10,653,116 B2 | 5/2020 | Dugan |
| 10,687,513 B2 | 6/2020 | Dugan |
| 10,709,113 B2 | 7/2020 | ONeill |
| D919,899 S | 5/2021 | Lopez |
| 11,013,297 B2 | 5/2021 | Ingram |
| 11,122,776 B2 | 9/2021 | Hoffman |
| 11,291,187 B2 | 4/2022 | Vesely |
| 2008/0177210 A1* | 7/2008 | McDevitt Larson ............... A01K 27/002 119/856 |
| 2011/0297105 A1* | 12/2011 | Horiuchi ............... A01K 15/04 119/792 |
| 2019/0269101 A1* | 9/2019 | Vesely ............... A01K 27/002 |
| 2021/0076641 A1* | 3/2021 | DeRosa ............... A01K 27/002 |
| 2021/0235669 A1* | 8/2021 | Rovang ............... A01K 27/002 |
| 2022/0104459 A1* | 4/2022 | Flynn ............... A01K 27/002 |
| 2023/0035255 A1* | 2/2023 | Rovang ............... A01K 27/005 |

\* cited by examiner

ANIMAL RESTRAINING APPARATUS

BACKGROUND

The subject of this patent application relates generally to animal restraints, and more particularly, to apparatuses that discourage animal pulling during walking and training.

By way of background, when not allowed to run free, dogs must be exercised to maintain health and vitality; most generally by being taken on walks. Walking is beneficial to the physical and mental health of both the dog and dog handler. Cardiovascular exercise from walking is widely appreciated, and although less apparent, the socialization skill enhancement when dogs meet other dogs and dog owners is as valuable to both pet and its owner.

Animal restraint devices are typically used to restrain and control the movement of dogs when outside the owner's property as well as to facilitate training of acceptable behaviors of the animal. For example, in urban areas, some restraint placed on the dog is a practical necessity both because of leash law regulations and traffic dangers. Restraint devices are also frequently required during the initial stages of obedience training particularly with younger dogs.

The majority of dog restraint devices seek control over the dog by placing some type of restraint around the neck, chest, or muzzle. Through such devices, the handler seeks to control, restrain, correct, and direct by pulling the dog backwards in a direction opposite from where the dog is presently heading. However, dogs possess a natural instinct and structure for running, pulling, digging, and for generally moving forward. As such, a dog restraint device is not natural, and the animal involuntarily reacts and instinctively move against the part of the body on which it feels pressure. Called the opposition reflexive response, this movement includes a lowering of the head followed by a shift in weight and strength to the front of the body, and a leaning forward away from the pulling force of the handler attempting to control the movement of the animal. Often a dog will become accustomed to the pain and discomfort and continue to pull, as these devices tend work against natural instincts. Unfortunately, this tugging/pulling behavior results in an adversarial process that is unpleasant for the dog and its handler and can potentially lead to injury of one or both.

The most common type of animal restraint device for controlling the movement of a dog is a neck collar attached to a leash. A neck collar, which include static, choke chain, spiked, and shock collars, has one strap that extends around an animal's neck, and can typically have its length adjustable to provide proper sizing and enable free rotation around the neck. When a dog tries to walk or run away and pulls the leash taut, and the dog feels pressure on the front of its neck thereby causing the animal to halt. Despite being simple and effective in restraining a dog, this approach may cause discomfort to the animal when it is pulling the leash in a reverse direction. This is particularly the case when the animal suddenly becomes excited, startled or aggressive, the collar exerts a strong impact force on the dog's neck and possibly inflicting damage. Additionally, the pressure caused by the collar on the front of the animal's neck may easily provoke an instinctual response of rushing forward of the animal, which results in either the dragging of the handler or severely injuring the dog due to the stress exerted by the neck collar.

In addition to neck collars, another animal restraint device useful for controlling a dog is a body harnesses. A body harness typically has multiple straps that loop around the torso of the dog with one strap extending across the chest in front of the forelimbs and one strap extending around the animal's thorax or belly behind the forelimbs. A leash can be attached to the harness on the torso strap near the back of the animal, on the chest strap near the forechest of the animal or at lateral locations on each side of the animal. When compared to a neck collar, a body harnesses better disperses pressure caused by a leash throughout the animal's body which helps prevent injury to the animal as well as increases the influenced a handler has over the forward movement of animal which helps prevent injury to the handler walking the animal.

However, body harnesses also have severe disadvantageous to the dog and its handler. For example, a body harnesses with a back-mounted attachment point for a leash does not allow a handler to give the dog cues for learning how to walk and not drift left or right or compel lateral directional changes with ease, or without risk of injury to himself or the animal. A body harnesses with a chest-mounted attachment point for a leash only enables influence over the left or right side of the dog's body but fails to provide sufficient influence over the animal's center of gravity. Such chest-mounted leash sacrifice proper distribution of pressure, which can cause a multitude of injuries to a dog including ankle injuries, bicep impingement, and improper muscle development. A body harnesses with lateral-mounted attachment points for a leash sacrifices the handler's ability to compel lateral changes in and animal's direction.

Additionally, regardless of the attachment point(s), a body harness still signals the dog to pull on the leash, similar to a neck collar when the leash is pulled taut or if the straps are misaligned on the chest. This pulling elicits an opposition reflex response due to the location of a sensitive trigger point located in the center of the chest. This causes problems for the handler, including straining the handler's back, injuring the arm due to the dog's strong pull on the leash, or can result in the handler falling. Additionally, a sudden lunge by the dog can result in soft tissue damage between the legs and chest cavity for the dog.

A head muzzle, including a soft muzzle and a cage muzzle, is a third common type of animal restraint device useful for controlling a dog. A head muzzle typically has one strap that loop around the upper and lower jaws of the dog near the stop with another strap extending around the neck of the animal. A leash can be attached to the muzzle on the neck strap near the back of the animal's neck, or at the bottom portion of the muzzle strap. However, like a body harnesses, a head muzzle does not allow a handler to give the dog cues for learning how to walk and not drift left or right or compel lateral directional changes with ease, or without risk of injury to himself or the animal. Regardless of the attachment point(s), a head muzzle still signals the dog to pull on the leash, similar to other animal restraint devices and in turn elicits an opposition reflex response. As with other animal restraint devices, such response can cause injury to the handler. More importantly, an opposition reflex response can cause severe damage to the head and neck of the dog.

What is needed, therefore, are humane animal restraint devices and methods that discourages the dog's opposition reflex response without inflicting excessive discomfort or great force to operate while still providing proper control, restrain, correction capabilities to facilitate behavior training for the animal. Aspects of the present invention fulfill these needs and provide further related advantages as described in the following summary.

SUMMARY

An animal restraining device disclosed herein comprises a foreleg constraining leash and a support strap. A foreleg constraining leash is configured to connect to a leash at one end and, at the other end, an anchor point which can be an animal restraint device, such as, e.g., a neck collar, a body harness, or a head muzzle. The foreleg constraining leash is configured to form a foreleg humerus loop sized and shaped to fit around a foreleg of an animal. The foreleg constraining leash is held in place by the support strap. The support strap attaches at one end to the foreleg constraining leash and at the other end to an anchor point, such as, e.g., the other foreleg of the animal or to a body harness secured on the animal. Once the support strap is secured to an animal, the support strap maintains the position of the foreleg humerus loop high above the elbow of the animal's foreleg which ensures that the animal restraining apparatus operates properly and prevents the foreleg humerus loop slipping off the animal's foreleg or simply having the animal step out of the loop. In operation, when a handler holds the leash firmly, the foreleg constraining leash will causes a reduction in loop size of the foreleg humerus loop around the foreleg of the animal. This reduction in loop size impedes the foreleg of the animal to move freely forward which is instinctually sensed by the animal causing it to stop. If the animal tries to move forward while the leash is still firmly held by the handler it immediately senses that it will become off-balance and the animal will cease trying to move forward.

Aspects of the present specification disclose, in part, an animal restraining apparatus. A disclosed animal restraining apparatus comprises a foreleg restraining leash and a support strap. In some aspects, a foreleg constraining leash disclosed herein comprises a leash end opposite a restraint end, with the leash end including a leash connector and the restraint end including a restraint connector, the foreleg constraining leash capable of forming a first foreleg humerus loop between the leash end and the restraint end. In some aspects, a foreleg constraining leash disclosed herein comprises a leash end opposite a restraint end, with the leash end being integral to a leash and the restraint end including a restraint connector, the foreleg constraining leash capable of forming a foreleg humerus loop between the leash end and the restraint end. In some aspects, a support strap disclosed herein comprises a leash constraining end opposite an anchor point end, with the leash constraining end including a loop connector and the anchor point end including an anchor connector, with the loop connector configured to couple the foreleg constraining leash to the support strap.

In other aspects of the present specification disclose, in part, a method of donning an animal restraining apparatus disclosed herein onto an animal. In some aspects, a disclosed method of donning comprises inserting a first foreleg of the animal through the foreleg humerus loop of the foreleg constraining leash and a second foreleg of the animal through an anchor connector of the support strap. In other aspects, a disclosed method of donning comprises inserting a first foreleg of the animal through the foreleg humerus loop of the foreleg constraining leash and securing the anchor connector of the support strap to an animal restraint device like a body harness. The foreleg humerus loop and anchor connector are configured so that the foreleg humerus loop is in a proximal position above the elbow of the first foreleg with a top portion of the foreleg humerus loop positioned in a humerus/scapula region of the first foreleg and a bottom portion of the foreleg humerus loop nested beneath an axilla region of the first foreleg. In some aspects, the leash connector is then connected to a leash and the restraint connector is secured to an anchor point which can be an animal restraint device like a neck collar or a head muzzle. In some aspects, where the foreleg constraining leash comprises a leash end that is integral to a leash, the restraint connector is secured to an animal restraint device like a neck collar or a head muzzle.

In other aspects of the present specification disclose, in part, a method of controlling movement of an animal using an animal restraining apparatus disclosed herein. In some aspects, a disclosed method of controlling movement of an animal comprises applying a force to the foreleg restraining leash of the animal restraining apparatus in a manner that causes a reduction in loop size of the foreleg humerus loop around a foreleg of the animal, wherein reduction in loop size of the foreleg humerus loop impedes the foreleg of the animal to move freely forward causing the animal to instinctually cease its movement.

In other aspects of the present specification disclose, in part, a kit comprising an animal restraining apparatus, and one or more animal restraint devices and/or a leash. In some aspects, an animal restraint device includes a neck collar, a body harness, a head muzzle, or any combination thereof.

Other features and advantages of aspects of an animal restraining apparatus disclosed herein will become apparent from the following more detailed description, taken in conjunction with the accompanying drawings, which illustrate, by way of example, the principles of aspects of the disclosed animal restraining apparatus.

BRIEF DESCRIPTION OF THE DRAWINGS

The accompanying drawings, which are incorporated in and constitute a part of this specification, illustrate aspects of the disclosed subject matter in at least one of its exemplary embodiments, which are further defined in detail in the following description. Features, elements, and aspects of the disclosure are referenced by numerals with like numerals in different drawings representing the same, equivalent, or similar features, elements, or aspects, in accordance with one or more embodiments. The drawings are not necessarily to scale, emphasis instead being placed upon illustrating the principles herein described and provided by exemplary embodiments of the invention. In such drawings.

Figure 1:
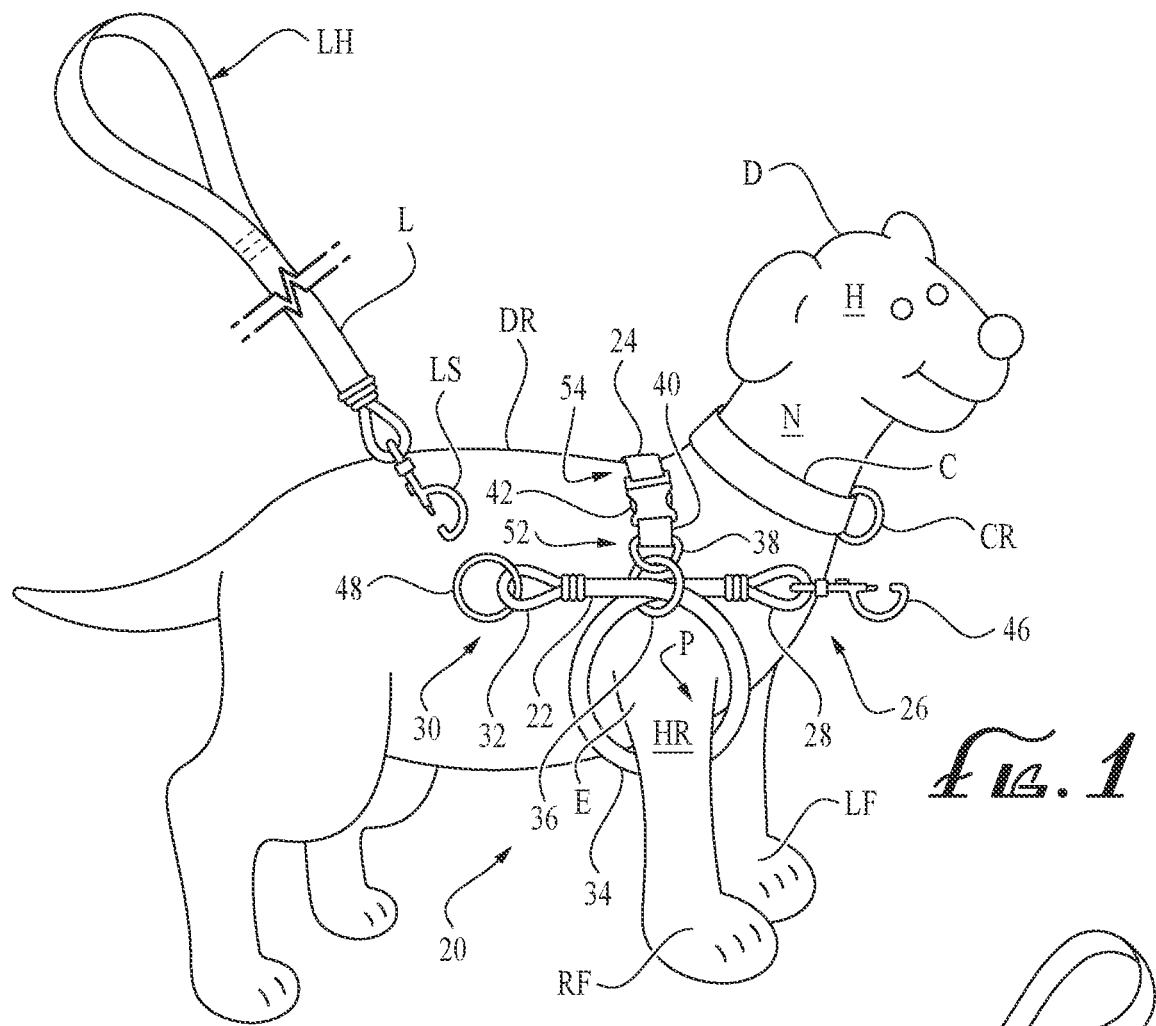
FIG. 1 is a first side view of an exemplary embodiment of an animal restraining apparatus disclosed herein, with the animal restraining apparatus being secured to a dog wearing a neck collar as the animal restraint device.

| Listing of Reference Numbers Associated with Drawings | |
|---|---|
| Ref. No. | Element |
| 20 | Animal restraining apparatus |
| 22 | Foreleg constraining leash |
| 24 | Support strap |
| 26 | Restraint end |
| 28 | Eye loop |
| 30 | Leash end |
| 32 | Eye loop |
| 34 | Foreleg humerus loop |
| 36 | Loop ring |
| 38 | Support ring |
| 40 | First connector strap |
| 42 | Release buckle |
| 44 | First slide buckle |
| 45 | Second slide buckle |
| 46 | Collar bolt snap |
| 48 | Leash ring |
| 50 | Second foreleg loop |
| 52 | Constraining leash end |
| 54 | Dorsal traversing portion |
| 56 | Anchor point end |
| 58 | Stop |
| 60 | Foreleg anchor |
| 62 | D-ring |
| 64 | Second harness bolt snap |
| 66 | Second connector strap |
| L | Leash |
| LH | Leash handhold |
| LS | Leash bolt snap |
| C | Collar |
| CR | Collar ring |
| D | Dog |
| H | Head |
| N | Neck |
| RF | Right foreleg |
| LF | Left foreleg |
| E | Elbow |
| HR | Humerus/scapula region |
| DR | Dorsal region |
| P | Proximal position |
| T | Tail |
| BH | Body harness |
| TS | Torso strap |
| CS | Chest strap |
| M | Muzzle |
| MS | Muzzle strap |
| NS | Neck Strap |
| MR | Muzzle Ring |

DETAILED DESCRIPTION

The present specification discloses an animal restraining apparatus that prevents an animal from pulling on its leash without inducing discomfort or pain to control the animal. Unlike currently available animal restraint devices, such as, e.g., a neck collar, a body harness, or a head muzzle, an animal restraining device disclosed herein controls an animal's movement by taking advantage of the fact that, while the upper leg musculature involved in extending a foreleg backward to generate a pulling movement has considerable strength, the upper leg musculature involved in flexing a foreleg upward to generate a lifting movement necessary for forward movement has significantly less strength. As such, an animal restraining device disclosed herein applies a relatively small force against the weak flexing muscles of the upper leg that prevents the upper leg musculature from generating a lifting movement. Impeding the upward lifting movement of a foreleg restricts forward movement to create an off-balanced stance, such as, e.g., a three-legged stance, that causes the animal to immediately stop forward movement in order to maintain stability. In addition, the animal immediately senses that it will become off-balance on any further attempt to move forward and thus will stop trying to move forward. Furthermore, since an animal restraining device disclosed herein impedes the weak flexing muscles of the upper foreleg very minimal effort or force is required by the handler to control the forward movement of the animal. Therefore, an animal restraining device disclosed herein provides a safe and humane method that discourages forward movement of an animal without requiring significant pulling force to operate or inflicting discomfort to either the animal or handler, while still providing proper control, restrain, and correction capabilities to facilitate behavior training for the animal.

An animal restraining device disclosed herein comprises a foreleg constraining leash and a support strap. A foreleg constraining leash comprises a leash end including a leash connector and a restraint end including restraint connector, with the leash end opposite the restraint end. The leash connector is configured to connect to a leash and the restraint connector is configured to connect to an animal restraint device, such as, e.g., a neck collar, a body harness, or a head muzzle. A support strap comprises a leash constraining end including a loop connector and an anchor point end including an anchor connector, with the leash constraining end opposite the anchor point end. The loop connector is configured to couple the foreleg constraining leash to the support strap in a manner that forms a foreleg humerus loop between the leash end and the restraint end of the foreleg constraining leash while allowing the foreleg constraining leash to freely slide through the loop connector to permit constriction or expansion of the foreleg humerus loop. The foreleg humerus loop is sized and shaped to fit around a foreleg of an animal. The support strap is configured to secure the foreleg constraining leash on an animal in a manner that maintains the position of the foreleg humerus loop high above the elbow of the animal's foreleg which ensures that the animal restraining apparatus operates properly and prevents the foreleg humerus loop slipping off the animal's foreleg or simply having the animal step out of the loop.

Referring first to FIGS. 1-2 & 8-13, a dog D is illustrated with an animal restraining apparatus 20 fitted thereon. It can be seen that animal restraining apparatus 20 is positioned on dog D, with While the embodiments exemplified herein position foreleg constraining leash 22 situated on the right side of dog D, foreleg constraining leash 22 and be positioned on the left side of dog D with the same effect. In addition, dog D is used only as a model animal, and animal restraining apparatus 20 should not be construed as being only useful for controlling dogs. Animal restraining apparatus 20 can be configured for use with any quadrupedal animal where a handler desires to control the movement of the animal. For example, animal restraining apparatus 20 can be used on any pet where walking is part of the care of the animal, such as, e.g., a cat or a potbelly pig. In addition, animal restraining apparatus 20 can be useful where training of an animal is desired or required, such as a horse for equestrian activities including sports and therapy.

Figure 4:
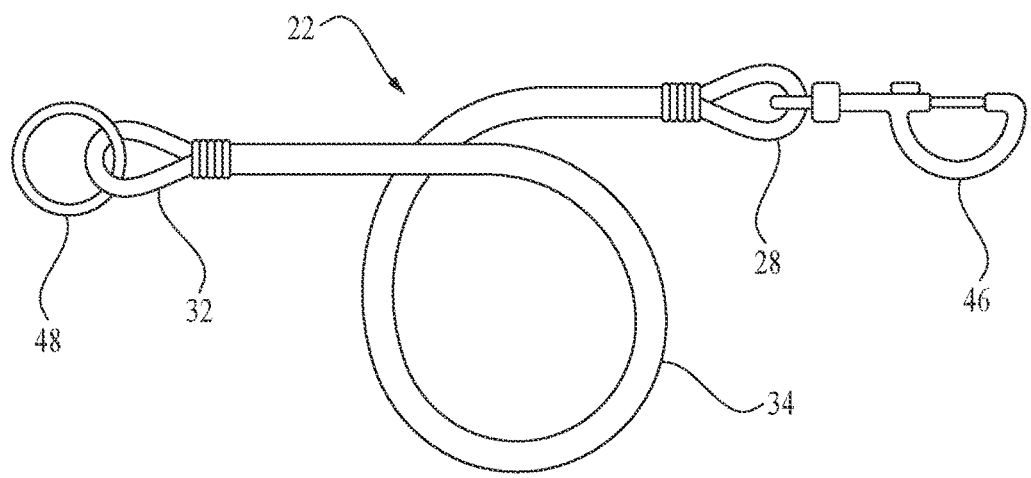
FIG. 4 is a plan view of a foreleg constraining leash of the animal restraining apparatus, shown in isolation.

FIGS. 1 & 4 illustrates an exemplary embodiment of animal restraining apparatus 20 comprises a foreleg constraining leash 22 and a support strap 24. Foreleg constraining leash 22 comprises a restraint end 26 and a leash end 30 opposite restraint end 26, with restraint end 26 ending in a restraint connector comprising an eye loop 28 and a collar bolt snap 46 and leash end 30 ending in a leash connector comprising an eye loop 32 and a leash ring 48. Foreleg constraining leash 22 is a flexible, static or elastic, rope, cord, strap, or any other linear shaped line that can be formed into a loop to create a foreleg humerus loop 34. As shown in FIG. 1, foreleg humerus loop 34 is fitted onto a foreleg of an animal, which in this example embodiment is a right foreleg RF. Foreleg humerus loop 34 can be created by forming an underhand loop, an overhand loop, or even a forming a bight (a U-shaped loop), where the term loop does not necessarily mean that two portions of the foreleg constraining leash 22 must cross.

As shown in FIG. 1, foreleg humerus loop 34 is supported and held in loop fashion by a loop connector of support strap 24, which in this embodiment comprises a loop ring 36 permanently interlocked with a support ring 38. In this illustrated example, two portions of foreleg constraining leash 22 are threaded through loop ring 36 to form foreleg humerus loop 34. Eye loop 28 of restraint end 26 secures collar bolt snap 46 used to attach restraint end 26 to a collar C via, e.g., a collar ring CR which prevents withdrawal of restraint end 26 through the loop ring 36. Similarly, eye loop 32 of leash end 30 secures leash ring 48 used to attach leash end 30 to a leash L via, e.g., a leash bolt snap LS which prevents withdrawal of leash end 30 through the loop ring 36. Thus, once donned on dog D, foreleg constraining leash 22 is positioned entirely on one side of dog D (the right side in this example), with a foreleg (the right foreleg RF in this example) inserted into foreleg humerus loop 34, with a top portion of foreleg humerus loop 34 (at loop ring 36) being positioned above an elbow E in a humerus/scapula region HR of right foreleg RF of dog D and a bottom portion nested beneath the axilla region of right foreleg RF.

In the alternative embodiment of a U-shaped bight being formed in foreleg constraining leash 22 (not illustrated), the bight is pushed into loop ring 36 to form foreleg humerus loop 34, where right foreleg RF can be inserted therethrough. Once secured to support strap 24, foreleg constraining leash 22 appears somewhat like an inverted capital Greek letter omega, with loop ring 36 completing foreleg humerus loop 34.

Referring back to FIG. 1, although restraint end 26 and leash end 30 of foreleg constraining leash 22 are shown as comprising distinct eye loops 28, 32 respectively and distinct collar bolt snap 46 and leash ring 48 respectively, other arrangements of a restraint connector and a leash connector are possible. For example, foreleg constraining leash 22 can be configured so that the leash connector eliminates leash ring 48 with eye loop 32 now used to attach leash end 30 to leash L via, e.g., leash bolt snap LS.

In some embodiments, foreleg constraining leash 22 is configured to prevents withdrawal restraint end 26 and/or leash end 30 from a loop connector, thereby preventing of foreleg humerus loop 34 from becoming undone. Is some embodiments, for example, a foreleg constraining leash 22 can have one or more stops that prevent restraint end 26 and/or leash end 30 from withdrawing from a loop connector. For example, a stop can be positioned on either side of the loop connector in a manner that maintains the form foreleg humerus loop 34 between the leash end 30 and restraint end 26 while allowing the foreleg constraining leash 22 to freely slide through loop ring 36 to permit constriction or expansion of foreleg humerus loop 34 (see FIG. 12). Additionally, in other embodiments, one of or both restraint end 26 and leash end 30 can be configured to prevent withdrawal through a loop connector. For example, restraint end 26 and/or leash end 30 can have their respective eye loops 28, 32 configured to prevent withdrawal through the loop connector by, e.g., having eye loop 28 and/or eye loop 32 made of metal or other inflexible material and sized and shaped to be larger than the opening of the loop connector, having eye loop 28 and/or eye loop 32 further comprise a stop sized and shaped to be larger than the opening of the loop connector, or having a restraint connector, such as, e.g., collar bolt snap 46 and/or a leash connector, such as, e.g., leash ring 48 sized and shaped to be larger than the opening of the loop connector.

Figure 2:
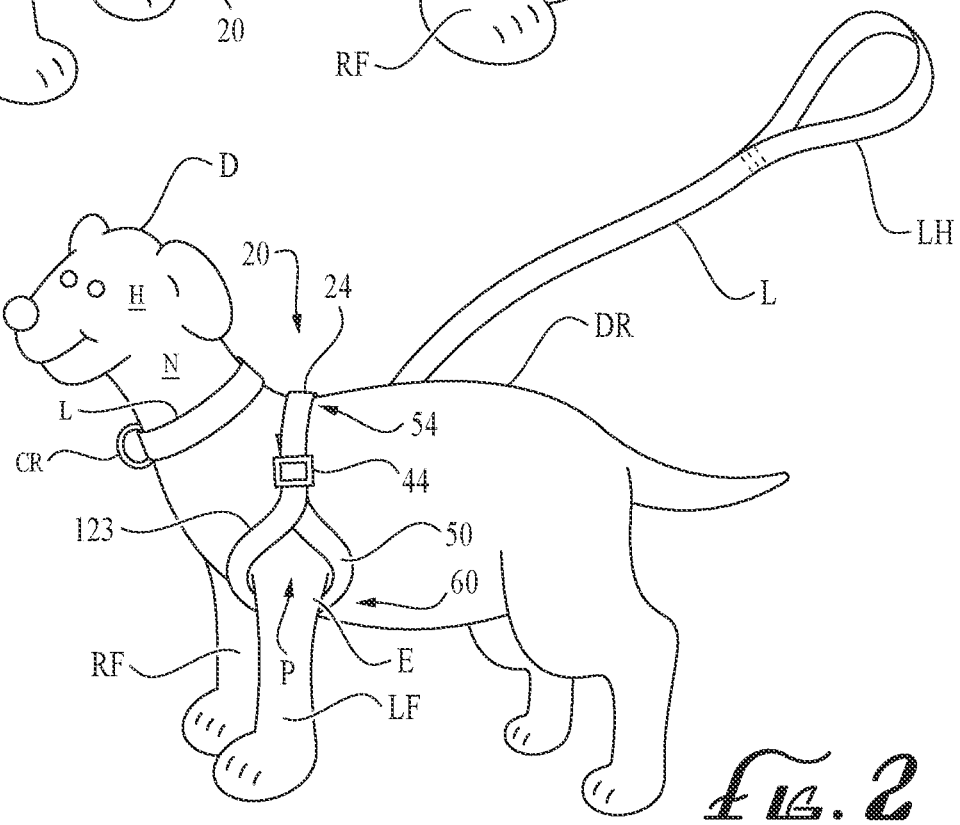
FIG. 2 is a second side view of the animal restraining apparatus, with the animal restraining apparatus shown on the opposite side of the dog.
Figure 3:
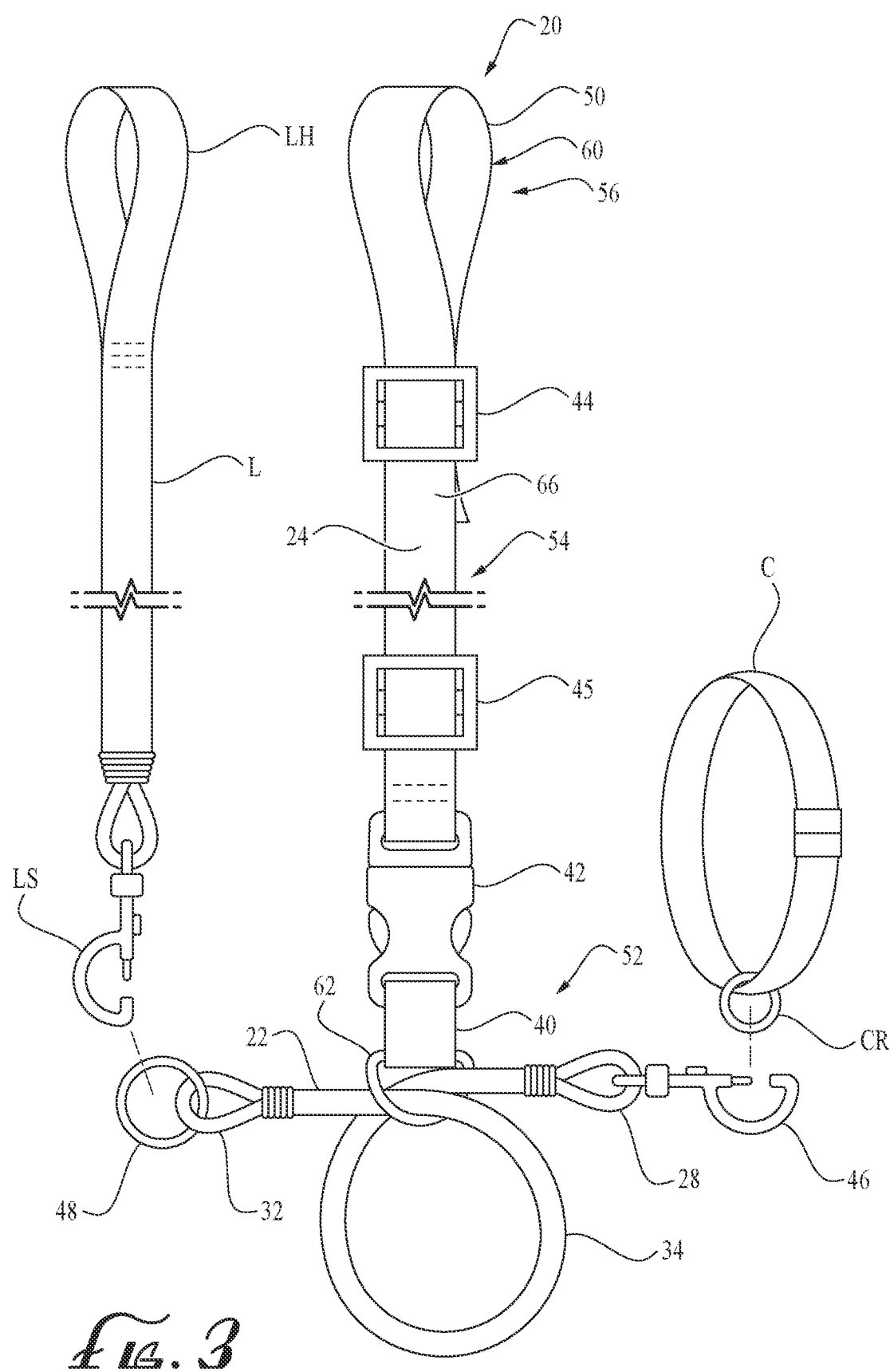
FIG. 3 is a plan view of the present animal restraining apparatus, additionally illustrating a standard leash and a collar with which the present animal restraining apparatus is compatible.
Figure 5:
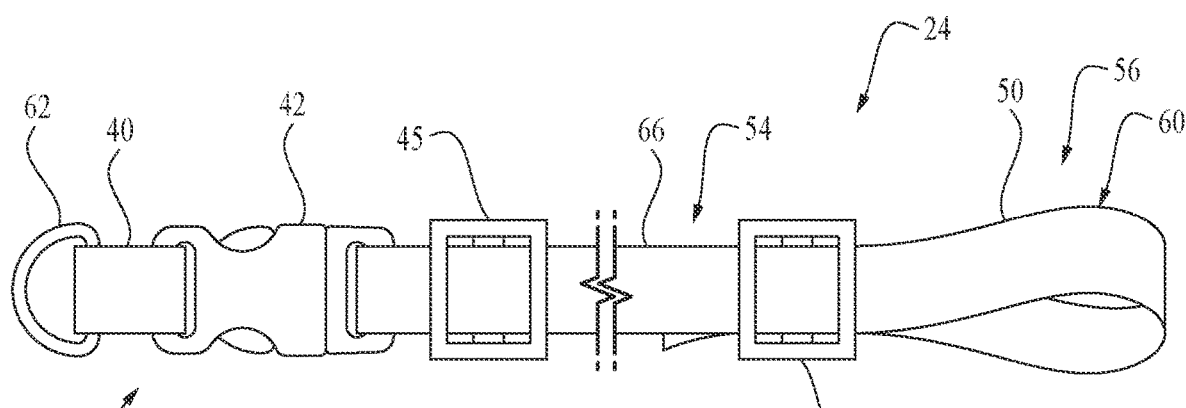
FIG. 5 is a plan view of a support strap of the animal restraining apparatus, shown in isolation.
Figure 6:
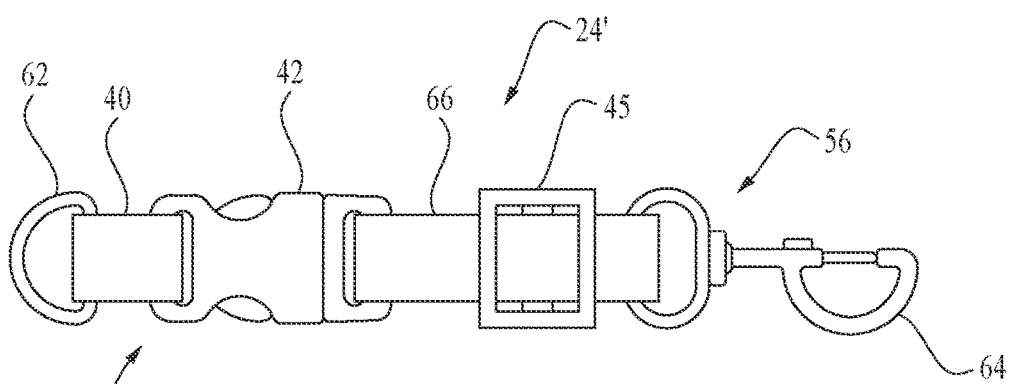
FIG. 6 is a plan view of an alternate support strap of the animal restraining apparatus, shown in isolation.

Referring now to FIGS. 1-3, 5 & 6, support strap 24 comprises a constraining leash end 52 and an anchor point end 56 opposite constraining leash end 52, with a dorsal traversing portion 54 therebetween. Dorsal traversing portion 54 is the part of support strap 24 that is positioned over a dorsal region DR of the back of dog D. Support strap 24 is a flexible, static, rope, cord, strap, or any other linear shaped line that can be stability secured to dog D and sufficiently support and position foreleg constraining leash 22. Support strap 24 can be made from nylon webbing or any other flexible, durable fabric or material. Constraining leash end 52 comprises a loop connector, such as, e.g., support ring 38 permanently interlocked with loop ring 36 (see FIG. 1) or D-ring 62 (see FIGS. 3, 5, & 6). Anchor point end 56 comprises an anchor connectors, such as, e.g., a foreleg anchor 60 (see FIGS. 2, 5 & 7) or a bolt snap 64 (see FIGS. 6 & 9). As best shown in FIGS. 3, 5, & 6, support strap 24 can optionally comprise a release buckle 42 at or near constraining leash end 52 and/or optionally comprise one or more slide buckles, such as, e.g., a slide buckle 44 and a slide buckle 45.

As best shown in FIGS. 1, 2, 8 10-13, support strap 24 has the primary purpose of holding foreleg humerus loop 34 in a desired position on an upper foreleg, which is a proximal position P above elbow E with a top portion of foreleg humerus loop 34 positioned in humerus/scapula region HR of an upper foreleg and a bottom portion of foreleg humerus loop 34 nested beneath an axilla region of the upper foreleg. This proximal position P of foreleg humerus loop 34 also prevents dog D from stepping out of foreleg humerus loop 34. To achieve proximal position P, support strap 24 should connect foreleg humerus loop 34 to an anchor point located and configured to maintain proximal position P of foreleg humerus loop 34. In one or more example embodiments, an anchor point can be the opposing leg (see FIG. 2), a body harness (see FIG. 9), or other support structure or body part that substantially holds and maintains proximal position P of foreleg humerus loop 34. In one or more embodiments, the support strap 24 may also be considered a support structure or the like. For example, a restraint connector, such as e.g., collar bolt snap 46 or other connector can couple foreleg humerus loop 34 or a loop connector, such as e.g., loop ring 36 or D-ring 62, directly to a second harness, such as a support harness, without a line element.

In some embodiments, and referring now FIGS. 1-3 & 5, animal restraining apparatus 20 comprises a support strap 24 which is configured to connect to an opposing leg of dog D (as shown in FIG. 2), such that the opposing leg acts as an anchor point to support foreleg humerus loop 34 in proximal position P. In these embodiments, support strap 24 comprises anchor point end 56 which ends in an anchor connector comprising a second foreleg loop 50 created by forming a loop of support strap 24 held in place and made adjustable by slide buckle 44, with anchor point end 56 now being referred to as a foreleg anchor 60. Slide buckle 44 can be used adjust the size of second foreleg loop 50 by increasing or decreasing the length of support strap 24 and to make smaller or enlarge the size of second foreleg loop 50. Proper adjustment of foreleg anchor 60 will ensure that foreleg humerus loop 34 in proximal position P on the first foreleg, which in this illustrated example is right foreleg RF. For example, as shown in FIG. 2, foreleg anchor 60 is positioned above elbow E of left foreleg LF with a top portion of second foreleg loop 50 positioned in a humerus/scapula region of left foreleg LF and a bottom portion of second foreleg loop 50 nested beneath an axilla region of left foreleg LF. As shown in FIG. 1, such position of foreleg anchor 60 results in foreleg humerus loop 34 being located in proximal position P above elbow E with a top portion of foreleg humerus loop 34 positioned in humerus/scapula region HR of right foreleg RF and a bottom portion of foreleg humerus loop 34 nested beneath an axilla region of right foreleg RF. Constraining leash end 52 comprises a loop connector comprising support ring 38 permanently interlocked with loop ring 36 with support ring 38 serving as the connector between constraining leash end 52 and loop ring 36. Loop connector comprising support ring 38 permanently interlocked with loop ring 36 is configured to couple foreleg constraining leash 22 to support strap 24 in a manner that forms foreleg humerus loop 34 between the leash end 30 and restraint end 26 of the foreleg constraining leash 22 while allowing the foreleg constraining leash 22 to freely slide through loop ring 36 to permit constriction or expansion of foreleg humerus loop 34. In yet another (not illustrated) variation of FIGS. 2, 3 & 5, second foreleg loop 50 can be sewn into a loop (much like the leash handhold LH), with slide buckle 44 eliminated, and the length adjustment integrated into the release buckle 42 or, if present, slide buckle 45. Thus, the exact arrangement and presence/absence of hardware may vary according to various design parameters, ease of use, cost, manufacturability, trim level, and so on. Furthermore, arrangements and variations described in reference to one particular embodiment can be interchanged and applied to each of the illustrated and discussed example embodiments.

Figure 9:
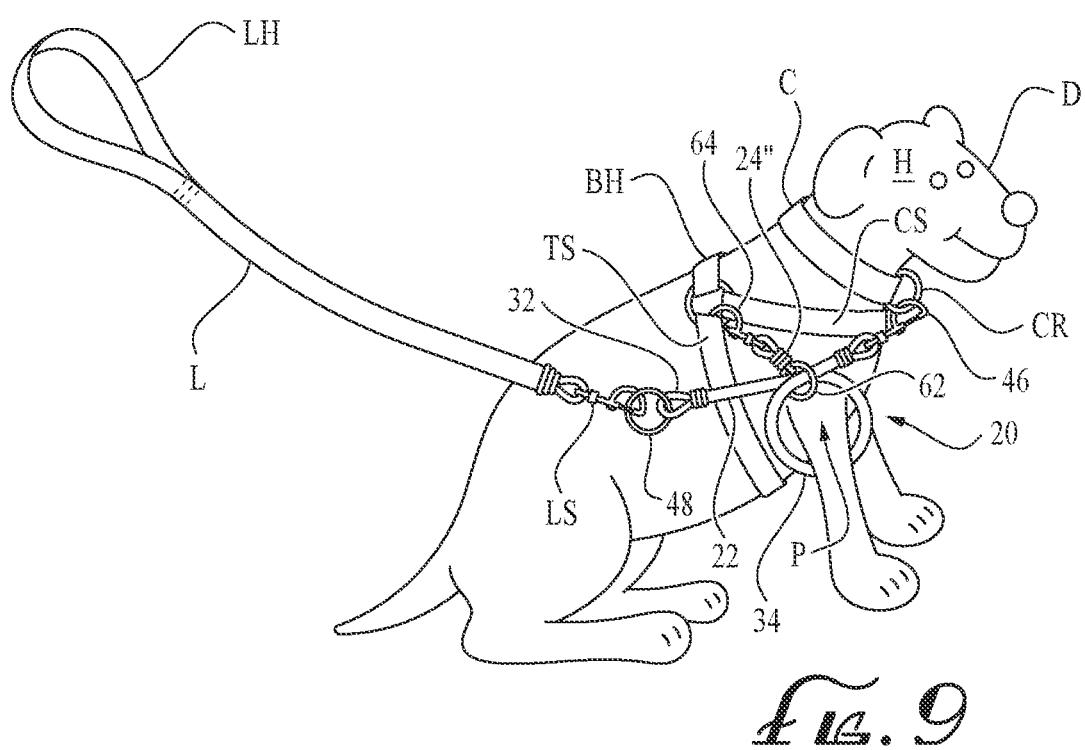
FIG. 9 is a side view of an alternate embodiment of the present animal restraining apparatus secured to a dog wearing a body harness as the animal restraint device.

In some embodiments, and as shown in FIG. 6, animal restraining apparatus 20 comprises a support strap 24' which is configured to connect to a body harness BH (as shown in FIG. 9), such that body harness BH acts as an anchor point to support foreleg humerus loop 34 in proximal position P. In these embodiments, support strap 24' comprises anchor point end 56 which ends in an anchor connector comprising a bolt snap 64, which serves to secure support strap 24' to body harness BH. Support strap 24' can optionally comprise slide buckle 45 which can be used can be used adjust the size of support strap 24' by increasing or decreasing its length. Proper adjustment of support strap 24' will keep foreleg humerus loop 34 in proximal position P on the first foreleg, which in this illustrated example is right foreleg RF. Constraining leash end 52 comprises a loop connector comprising D-ring 62 is configured to couple foreleg constraining leash 22 to support strap 24' in a manner that forms foreleg humerus loop 34 between the leash end 30 and restraint end 26 of the foreleg constraining leash 22. For example, two portions of foreleg constraining leash 22 can be threaded through the opening of D-ring 62 to form foreleg humerus loop 34, and thereby coupling support strap 24' to foreleg constraining leash 22. As with support strap 24, support strap 24' is configured to secure foreleg constraining leash 22 to dog D, maintain the form of foreleg humerus loop 34 as well as maintain the proximal position P of foreleg humerus loop 34, while allowing foreleg constraining leash 22 to freely slide through D-ring 62 to permit constriction and expansion of foreleg humerus loop 34. In addition to bolt snap 64, an openable snap link, ring link, carabiner, or any other openable shackle that can selectively connect support strap 24' to body harness BH can be used as an anchor connector.

Although exemplary versions of a loop connector have been illustrated as comprising loop ring 36 permanently interlocked with support ring 38 as shown in FIGS. 1, 8, 10-13 or comprising D-ring 62 as shown in FIGS. 1, 5, & 6, any loop connector that provides a slip fit and maintains the form of foreleg humerus loop 34 while allowing foreleg constraining leash 22 to freely slide therewithin to permit constriction and expansion of foreleg humerus loop 34 would be suitable. For example, in some embodiments, and as shown in FIG. 9, a loop connector comprises support ring 38 alone (i.e., loop ring 36 is absent) with support ring 38 functioning substantially similar to D-ring 62. In some embodiments (not illustrated), a loop connector comprises a leash end eye hole formed by using material at constraining leash end 52 of support strap 24 to create a loop by splicing, sewing, swaging, etc., and be used instead of loop ring 36, support ring 38, or D-ring 62 (all of which are absent) to maintain the form of foreleg humerus loop 34 while allowing foreleg constraining leash 22 to freely slide through leash end eye loop permit constriction and expansion of the foreleg humerus loop 34. In other embodiments (not illustrated), a portion of foreleg constraining leash 22 can be formed into a knot (such as a butterfly loop, farmer's loop, etc.), a second line can be spliced, sewn, or otherwise connected at each end to foreleg constraining leash 22 to form an eye, the line can be spliced into a Brummel eye splice, and so on. Furthermore, instead of loop ring 36, support ring 38, and/or D-ring 62 being permanently attached to support strap 24, an openable snap link, ring link, carabiner, or any other openable shackle that can selectively connect constraining leash end 52 to foreleg humerus loop 34 or another portion of foreleg constraining leash 22 can be used as a loop connector. As such, the multiple variations of a loop connector further illustrating the many small variations in hardware and connector arrangements that achieve the structure of animal restraining apparatus 20.

For ease of donning and doffing animal restraining apparatus 20, support strap 24 can be divided into two detachable sections. For example, as shown in FIGS. 3 & 5, support strap 24 comprises a first connector strap 40 at constraining leash end 52 and a second connector strap 66 at anchor point end 56, with connector strap 40 and second connector strap 66 being reversibly attachable to each other using release buckle 42. As shown in FIGS. 1, 3, 5, & 6, first connector strap 40 in this example embodiment, is a short length of webbing with support ring 38 (see FIG. 1) or D-ring 62 (see FIGS. 3, 5, & 6) attached to one end and a mating half of release buckle 42 attached to the other end. Manually separating release buckle 42 will separate second connector strap 66 from first connector strap 40. Such separation permits foreleg humerus loop 34 to be placed onto right foreleg RF (or alternatively, left foreleg LF) and second foreleg loop 50 to be placed onto left foreleg LF (or alternatively, right foreleg RF). A handler then would pull second connector strap 66 which comprises dorsal traversing portion 54 over dorsal region DR of the back of dog D and connect the mating parts of release buckle 42. Once first connector strap 40 and second connector strap 66 are attached, support strap 24 can be adjusted by the handler to ensure foreleg humerus loop 34 is in the proper proximal position P. A handler would then connect restraint connector comprising collar bolt snap 46 to collar ring CR and leash bolt snap LS to, in some embodiments, leash connector comprising leash ring 48 or, in other embodiments, directly to eye loop 32 which now serves as a leash connector (i.e., leash ring 48 is absent). Removing animal restraining apparatus 20 is achieved by uncoupling collar bolt snap 46 and leash bolt snap LS, unbuckling release buckle 42, and sliding foreleg humerus loop 34 and second foreleg loop 50 off the respective forelegs of dog D.

Figure 7:
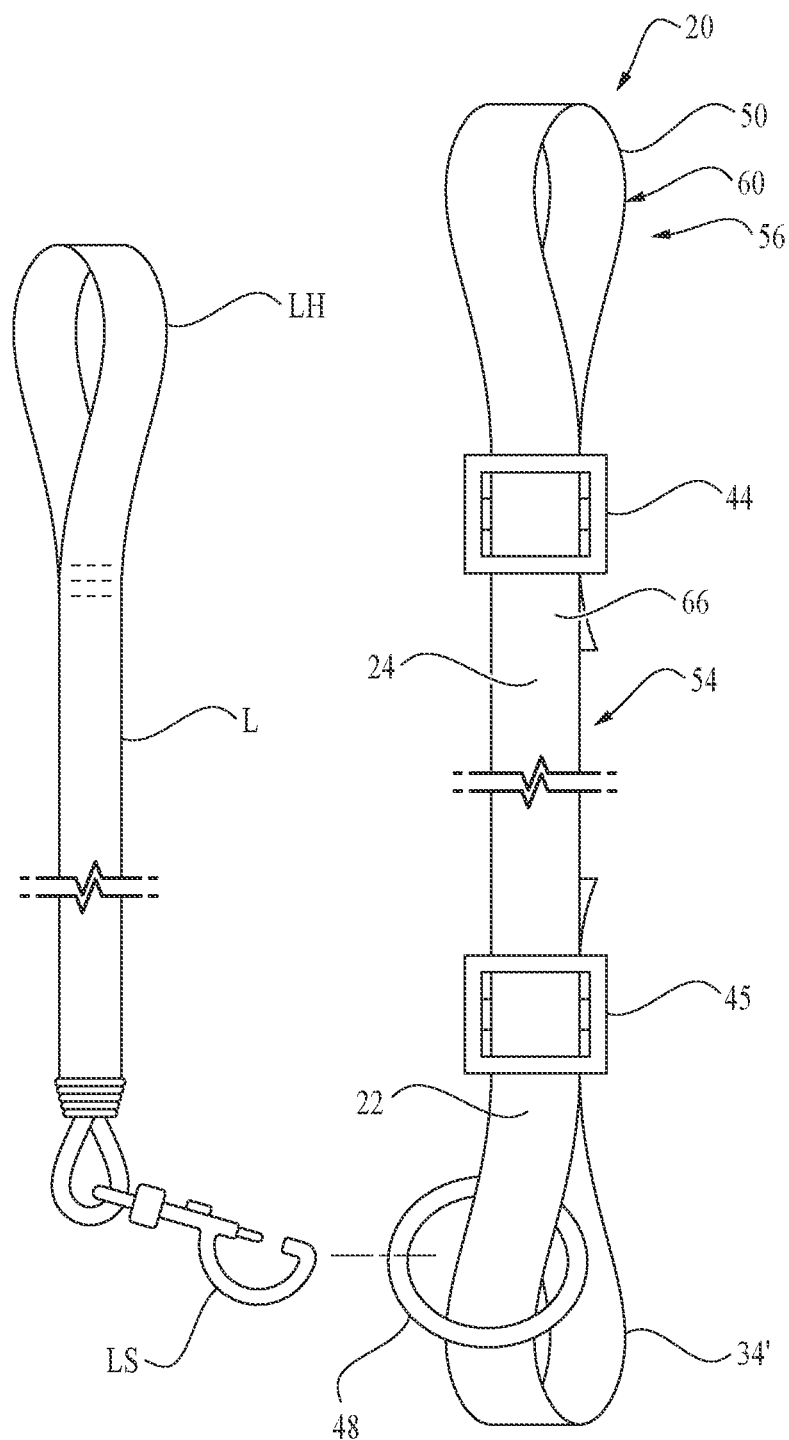
FIG. 7 is a plan view of an alternate support strap of the animal restraining apparatus, shown in isolation.
Figure 11:
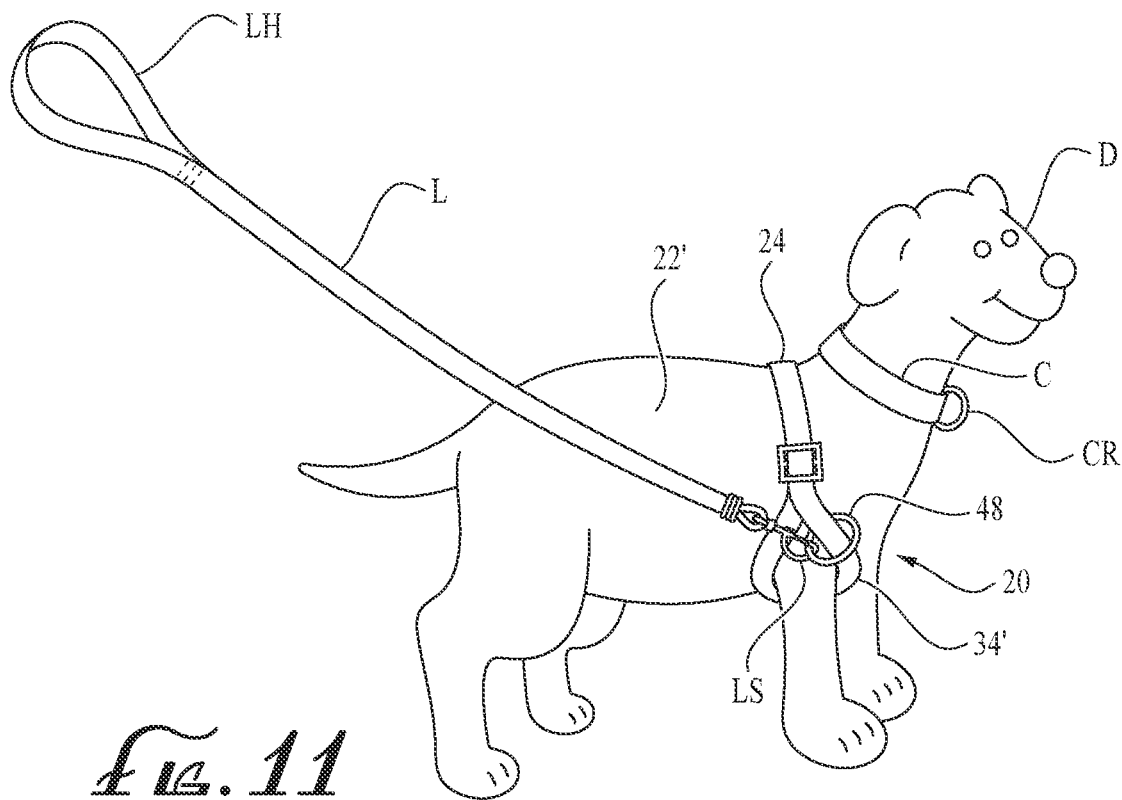
FIG. 11 is a side view of the present animal restraining apparatus of FIG. 7 secured to a dog.

In some embodiments, foreleg constraining leash 22 and support strap 24 of animal restraining apparatus 20 are configured into single integrated component. For example, as shown in FIG. 7, foreleg constraining leash 22 and support strap 24 are composed of a single flexible, static, rope, cord, strap, or any other linear shaped line that can be stability secured to dog D and sufficiently support and position foreleg constraining leash 22. Foreleg humerus loop 34' is created by forming a loop of foreleg constraining leash 22 held in place and made adjustable by slide buckle 45. Slide buckle 45 can be used adjust the size of foreleg humerus loop 34' by increasing or decreasing the length of support strap 24 and to make smaller or enlarge the size of foreleg humerus loop 34'. As in other embodiments (see FIGS. 3 & 5), support strap 24 comprises anchor point end 56 which ends in an anchor connector comprising second foreleg loop 50 created by forming a loop of support strap 24 held in place and made adjustable by slide buckle 44 to form foreleg anchor 60. Slide buckle 44 can be used adjust the size of second foreleg loop 50 by increasing or decreasing the length of support strap 24 and to make smaller or enlarge the size of second foreleg loop 50. Proper adjustment of foreleg anchor 60 will ensure that foreleg humerus loop 34' in proximal position P on the first foreleg, which in this illustrated example is right foreleg RF. Leash L is secured to foreleg constraining leash 22 using, in some embodiments, a leash connector, such as, e.g., leash ring 48 as depicted in FIGS. 7 & 11) or, in other embodiments, directly to foreleg humerus loop 34' (i.e., leash ring 48 is absent; not shown). In the embodiments depicted in FIG. 7, foreleg constraining leash 22 lacks both a loop connector as disclosed herein as well as a restraint connector as disclosed herein.

Figure 8:
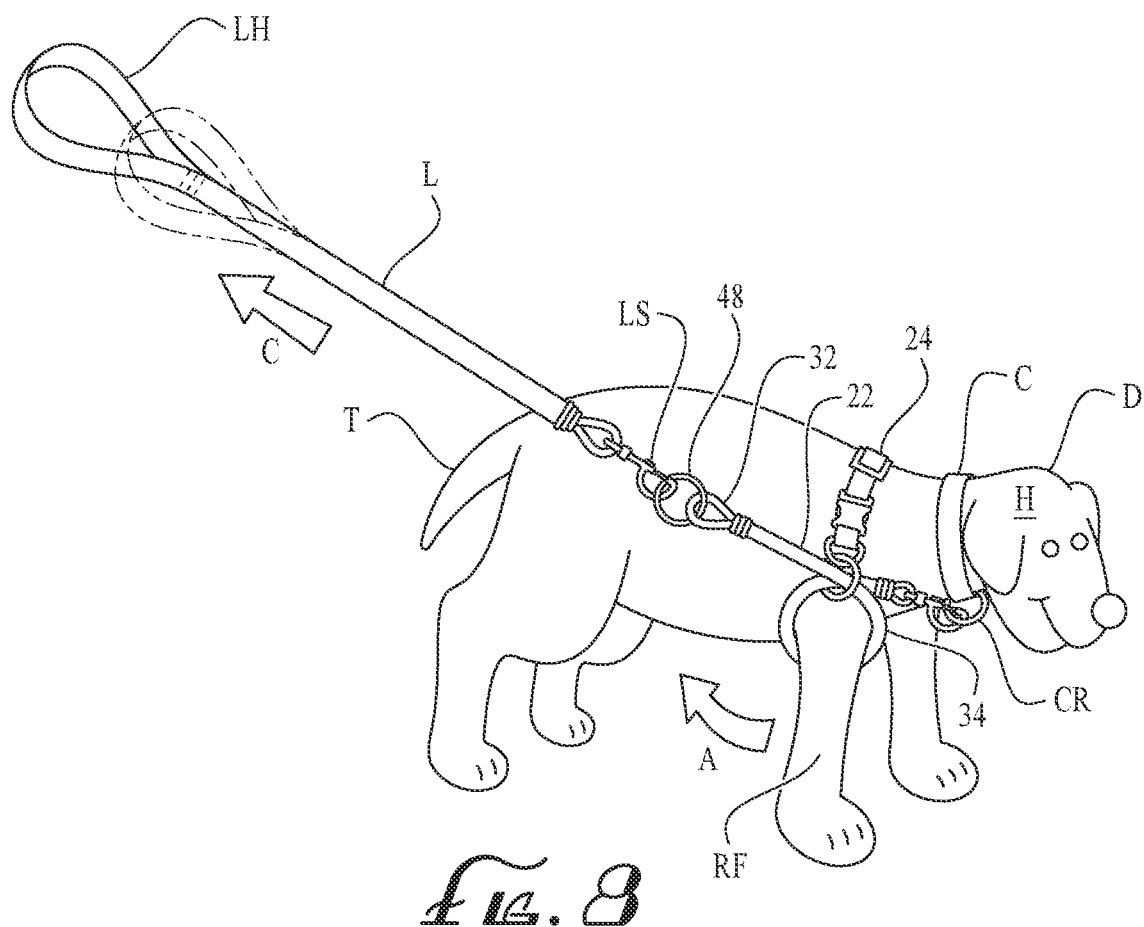
FIG. 8 is a side view of the present animal restraining apparatus donned on a dog, illustrating a force being applied to the leash end of the foreleg constraining leash to bring the dog under control.

FIG. 8 illustrates a method of controlling an animal using the example embodiment of FIG. 1, which shows the action of animal restraining apparatus 20, when a handler holds leash L firmly in an effort to control a behavior of dog D or for training purposes. Upon the handler holding leash L firmly in an effort to control the movement of dog D, a tension force is applied to leash L, as indicated by arrow A, which pulls foreleg constraining leash 22 in a caudal direction, causing a reduction in loop size of foreleg humerus loop 34 around right foreleg RF of dog D. This reduction in loop size of foreleg humerus loop 34 will apply force on the right foreleg RF which will prevent substantial forward movement of the right foreleg RF, as indicated by arrow B. If dog D attempts to lift right foreleg RF in an effort to move forward against force B, right foreleg RF will be pulled backward slightly or pulled/tucked upward towards the body, creating the 3-legged stance. This impedance of forward movement of right foreleg RF will be sensed by dog D causing it to experience a sensation of instability sufficient to cause dog D to immediately stop any forward movement. If dog D tries to move forward while leash L is still firmly held by handler, it immediately senses that it will become off-balance again and dog D will stop trying to move forward. The restraining force applied by foreleg humerus loop 34 which is required to prevent forward movement of right foreleg RF is relatively small, as dog D has significantly weak flexing muscles of the upper foreleg to lift right foreleg RF forward. Thus, applying a relatively small restraining force, the handler can easily create a sense of unpleasant instability in dog D, such that dog D quickly stops moving to avert this off-balanced sensation without pain or substantial discomfort to dog D. If dog D attempts to pull strenuously or aggressively pull against tension force is applied to leash L, foreleg constraining leash 22 further reduces the size of foreleg humerus loop 34 and also pulls neck collar CR causing head H of dog D to be pulled down and toward the side (the right side in this example), into a more submissive position.

In some embodiments, and referring now to FIG. 9, animal restraining apparatus 20 can utilize a standard body harness BH and leash L (although a specialized harness could also be employed) to secure foreleg constraining leash 22 to dog D. In this illustrated embodiment, a support strap 24" is shown although support strap 24' of FIG. 6 can also be used. Somewhat like support strap 24', support strap 24" is a single piece component that lacks release buckle 42 but includes a second harness bolt snap 64 on one end and loop ring 62 on the opposite end. As with support strap 24' and 24', support strap 24" is configured to secure foreleg constraining leash 22 to dog D, maintain the form of foreleg humerus loop 34 as well as maintain the proximal position P of foreleg humerus loop 34, while allowing foreleg constraining leash 22 to freely slide therewithin permit constriction and expansion of foreleg humerus loop 34. In some embodiments, and a shown in FIG. 9, second harness bolt snap 64 of support strap 24' or support strap 24" would be secured to a torso strap TS of body harness BH and collar bolt snap 46 of foreleg constraining leash 22 would be secured to collar ring CR, such that the proximal position P of the foreleg humerus loop 34 is properly maintained. In some embodiments, second harness bolt snap 64 of support strap 24' or support strap 24" would be secured to torso strap TS of body harness BH and collar bolt snap 46 of foreleg constraining leash 22 would be secured to a chest strap CS of body harness BH, such that the proximal position P of the foreleg humerus loop 34 is properly maintained. In embodiments where foreleg constraining leash 22 comprises eye loop 32 with or without leash ring 48, leash bolt snap LS is secured to, in some embodiments, leash ring 48 or, in other embodiments directly to eye loop 32 (i.e., leash ring 48 is absent). Once animal restraining apparatus 20 is secured to leash L and body harness BH with or without collar C connection, a handler can grasp leash handhold LH to apply a tension on leash L if required by the behavior of dog D or for training purposes. Except for this different attachment points locations present on body harness BH, foreleg constraining leash 22 operates in the same manner in controlling the movement of dog D as described in the embodiments for attachment to neck collar C. As with other embodiments, foreleg humerus loop 34 of animal restraining apparatus 20 can be positioned on the right or left side of dog D with the same effect.

Figure 10:
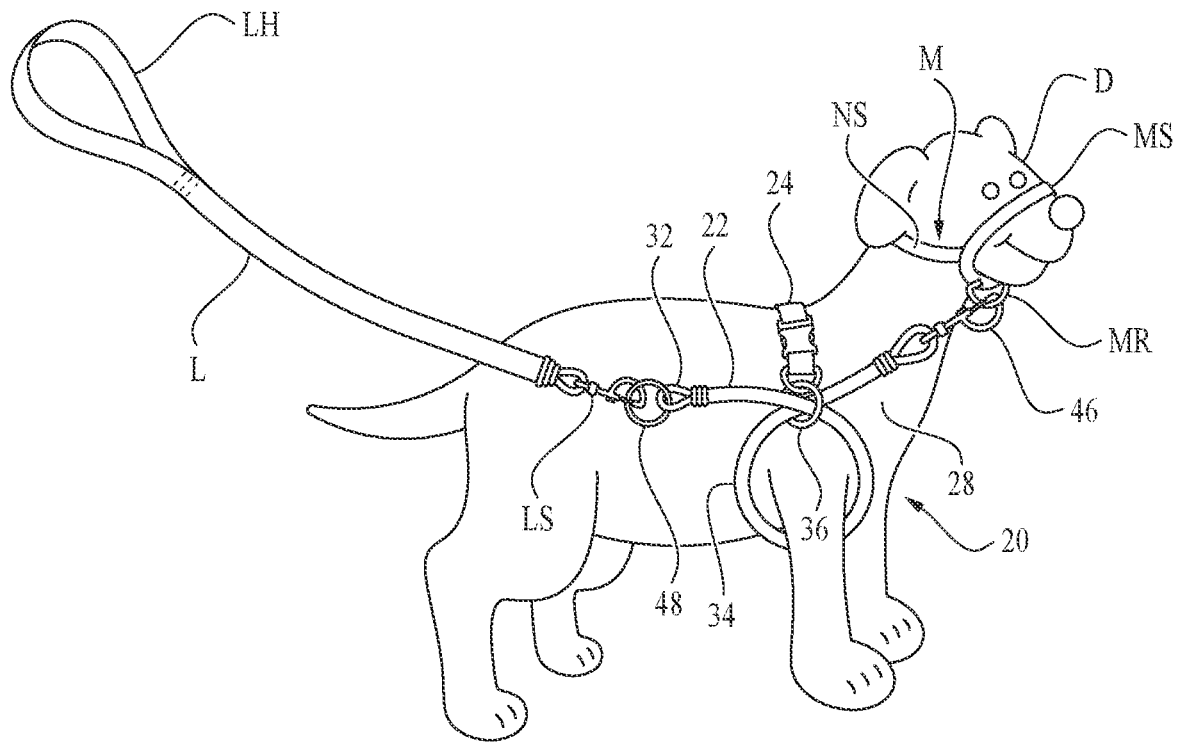
FIG. 10 is a side view of an alternate embodiment of the present animal restraining apparatus secured to a dog wearing a head muzzle as the animal restraint device.

In some embodiments, and referring now to FIG. 10, animal restraining apparatus 20 can utilize a standard head muzzle M and leash L (although a specialized muzzle could also be employed) to secure foreleg constraining leash 22 to dog D. As with other embodiments, support strap 24 is configured to secure foreleg constraining leash 22 to dog D, to maintain the form of foreleg humerus loop 34 as well as maintain the proximal position P of foreleg humerus loop 34, while allowing foreleg constraining leash 22 to freely slide therewithin permit constriction and expansion of the foreleg humerus loop 34. Although support strap 24 is shown in this illustrated embodiment, support strap 24' of FIG. 6 or support strap 24''' of FIG. 9 can also be used if body harness BH is employed. Eye loop 28 comprises bolt snap 46 which is used to secure restraint end 26 of foreleg constraining leash 22 to muzzle ring MR of head muzzle M. As with other embodiments, foreleg constraining leash 22 would be secured to leash bolt snap LS, in some embodiments, using leash ring 48 or, in other embodiments, directly to eye loop 32 (i.e., leash ring 48 is absent). Once animal restraining apparatus 20 is secured to leash L and head muzzle M, the handler can grasp the leash handhold LH to apply a tension on the leash L if required by the behavior of the dog D or for training purposes. Except for this different attachment points locations present on head muzzle M, foreleg constraining leash 22 operates in the same manner in controlling the movement of dog D as described in the embodiments for attachment to neck collar C. As with other embodiments, foreleg humerus loop 34 of animal restraining apparatus 20 can be positioned on the right or left side of dog D with the same effect.

FIG. 11 illustrates an embodiment of animal restraining apparatus 20 of FIG. 7 where leash L is secured to foreleg constraining leash 22 to dog D but animal restraining apparatus 20 is not secured to an animal restraint device, such as, e.g., a neck collar, a body harness, or a head muzzle. As with other embodiments, support strap 24 is configured to secure foreleg constraining leash 22 to dog D and maintain both the form of foreleg humerus loop 34' as well as its proximal position P However, unlike other embodiments, support strap 24 is not configured to allow foreleg constraining leash 22 to freely slide therewithin permit constriction and expansion of the foreleg humerus loop 34'. Foreleg constraining leash 22 would be secured to leash bolt snap LS, in some embodiments, using leash ring 48 or, in other embodiments, directly to foreleg humerus loop 34' (i.e., leash ring 48 is absent). In addition, although leash ring 48 is shown in FIG. 11 to be positioned on the front side of foreleg RF, leash ring 48 can alternatiely be positioned on the back side of foreleg RF. Once animal restraining apparatus 20 is secured to leash L, the handler can grasp the leash handhold LH to apply a tension on the leash L if required by the behavior of the dog D or for training purposes. Except for the fact that support strap 24 is not configured to allow foreleg constraining leash 22 to freely slide therewithin permit constriction and expansion of the foreleg humerus loop 34', foreleg constraining leash 22 operates in the same manner in controlling the movement of dog D as described in the embodiments for attachment to neck collar C. As with other embodiments, foreleg humerus loop 34' of animal restraining apparatus 20 can be positioned on the right or left side of dog D with the same effect.

Figure 12:
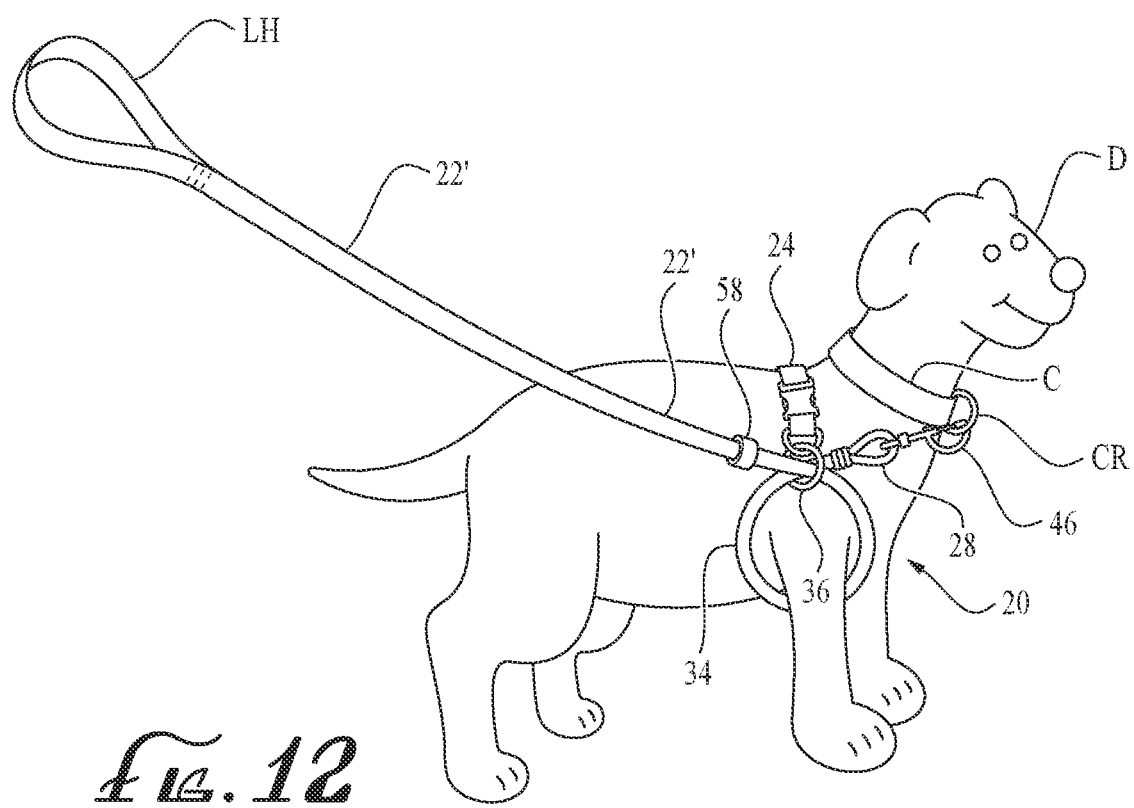
FIG. 12 is a side view of another alternate embodiment of the present animal restraining apparatus secured to a dog.

FIG. 12 illustrates an embodiment of animal restraining apparatus 20 where foreleg constraining leash 22' includes an integral leash (i.e., it is a continuous strap other type of line). In this embodiment, foreleg constraining leash 22' includes a leash handle LH at one end and eye loop 28 comprising collar bolt snap 46 at the opposite restraint end 26. Foreleg constraining leash 22' can optionally comprise a stop 58 configured to prevent withdrawal of restraint end 26 through loop ring 36, such as, e.g., having stop 58 being sized and shaped to be larger than the opening of loop ring 36. As with other embodiments, support strap 24 is configured to secure foreleg constraining leash 22 to dog D, to maintain the form of the foreleg humerus loop 34 as well as maintain the proximal position P of the foreleg humerus loop 34, while allowing the foreleg constraining leash 22 to freely slide therewithin permit constriction and expansion of the foreleg humerus loop 34. Although support strap 24 is shown in this illustrated embodiment, support strap 24' of FIG. 6 or support strap 24'' of FIG. 9 can also be used if body harness BH is employed. In some embodiments, and as shown in FIG. 12, eye loop 28 comprises bolt snap 46 which is used to secure restraint end 26 of foreleg constraining leash 22' to collar ring CR of neck collar C. In some embodiments (not illustrated), eye loop 28 comprises bolt snap 46 which is used to secure restraint end 26 of foreleg constraining leash 22' to muzzle ring MR of head muzzle M. Once animal restraining apparatus 20' is secured to neck collar C or head muzzle M, the handler can grasp leash handhold LH to apply a tension on leash L if required by the behavior of dog D or for training purposes. Except for this difference in construction, foreleg constraining leash 22' operates in the same manner as foreleg constraining leash 22. As with other embodiments, the foreleg humerus loop 34 of animal restraining apparatus 20 can be positioned on the right or left side of dog D with the same effect.

Figure 13:
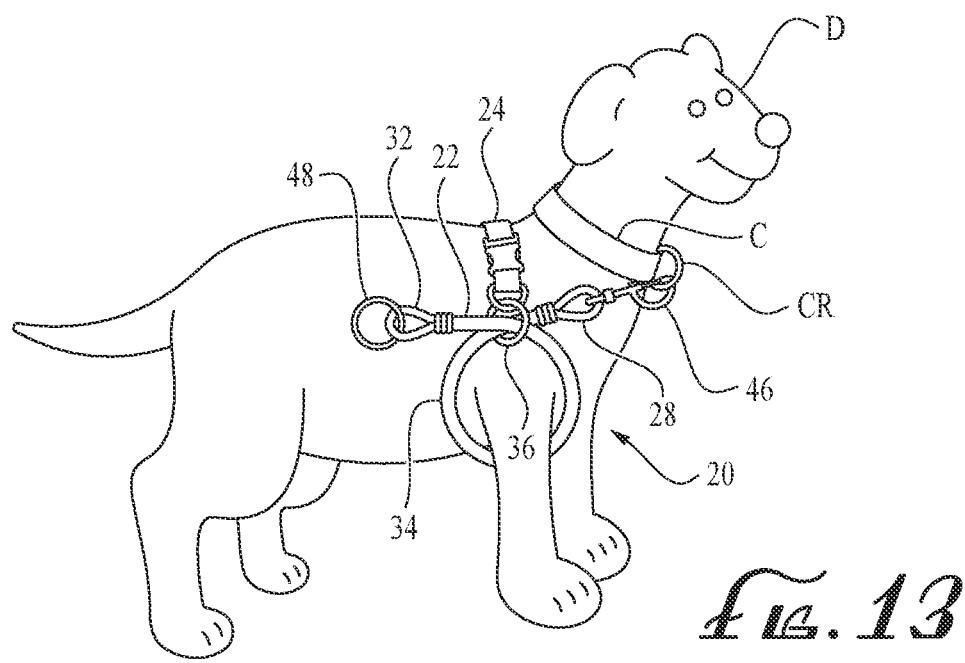
FIG. 13 is a side view of the present animal restraining apparatus donned on a dog of FIG. 1.

FIG. 13 is an illustration of the embodiment of FIG. 1 with the leash L removed, so that the dog D can run and move freely without substantial interference from the animal restraining apparatus 20. Even when disconnected from leash L, support strap 24 maintains both the form and proximal position P of the foreleg humerus loop 34 in a manner where foreleg humerus loop 34 does not interfere with the free movement of the forelegs of the animal. This feature is desirable in situations where a handler desires to have dog D run freely but wished to leave animal restraining apparatus 20 fitted on dog D.

Another aspect of the present specification disclose methods of donning animal restraining apparatus 20 onto an animal. In some embodiments, a disclosed method of donning animal restraining apparatus 20 comprises a) inserting a first foreleg of the animal through foreleg humerus loop 34 of foreleg constraining leash 22; b) inserting a second foreleg of the animal through an anchor connector comprising foreleg anchor 60 of support strap 24; c) securing a restraint connector to an animal restraint device; and d) securing a leash connector to a leash; wherein foreleg humerus loop 34 and the anchor connector are configured so that foreleg humerus loop 34 is in a proximal position above an elbow of the first foreleg. In aspects of these embodiments, a proximal position above an elbow of the first foreleg positions a top portion of foreleg humerus loop 34 in a humerus/scapula region of the first foreleg and a bottom portion of foreleg humerus loop beneath an axilla region of the first foreleg. In aspects of these embodiments, an animal restraint device includes a neck collar or a head muzzle.

In other embodiments, a disclosed method of donning animal restraining apparatus 20 comprises a) inserting a first foreleg of the animal through a foreleg humerus loop 34 of foreleg constraining leash 22; b) securing an anchor connector of support strap 24 to a first animal restraint device comprising a body harness; c) securing a restraint connector to a second animal restraint device; and d) securing a leash connector to a leash; wherein foreleg humerus loop 34 and the anchor connector are configured so that foreleg humerus loop 34 is in a proximal position above an elbow of the first foreleg. In aspects of these embodiments, a proximal position above an elbow of the first foreleg positions a top portion of foreleg humerus loop 34 in a humerus/scapula region of the first foreleg and a bottom portion of foreleg humerus loop beneath an axilla region of the first foreleg. In some aspects, the leash connector is then connected to a leash and the restraint connector is secured to an animal restraint device like a neck collar or a head muzzle. In aspects of these embodiments, a second animal restraint device includes a neck collar or a head muzzle.

In some embodiments, a disclosed method of donning animal restraining apparatus 20 comprises a) inserting a first foreleg of the animal through foreleg humerus loop 34 of foreleg constraining leash 22'; b) inserting a second foreleg of the animal through an anchor connector comprising foreleg anchor 60 of support strap 24; and c) securing a restraint connector to an animal restraint device; wherein foreleg humerus loop 34 and the anchor connector are configured so that foreleg humerus loop 34 is in a proximal position above an elbow of the first foreleg. In aspects of these embodiments, a proximal position above an elbow of the first foreleg positions a top portion of foreleg humerus loop 34 in a humerus/scapula region of the first foreleg and a bottom portion of foreleg humerus loop beneath an axilla region of the first foreleg. In aspects of these embodiments, an animal restraint device includes a neck collar or a head muzzle.

Another aspect of the present specification disclose methods of controlling movement of an animal using animal restraining apparatus 20. In some embodiments, a disclosed method of controlling movement of an animal comprises applying a force to foreleg restraining leash 22 of animal restraining apparatus 20 in a manner that causes a reduction in loop size of foreleg humerus loop 34 around a foreleg of the animal, wherein reduction in loop size of foreleg humerus loop 34 impedes the foreleg of the animal to move freely forward causing the animal to instinctually cease its movement.

Another aspect of the present specification disclose kits comprising animal using animal restraining apparatus 20. Although illustrated with animal restraining apparatus 20, leash L, collar C, body harness BH, and head muzzle M are not part of animal restraining apparatus 20, except for embodiments where animal restraining apparatus 20 and leash L are integral, such as the integrated leash of FIG. 10. However, animal restraining apparatus 20 can be part of a kit with such animal restraint devices. In some embodiments, a kit is disclosed herein comprising animal restraining apparatus 20 with neck collar C, body harness BH, head muzzle M, or any combination of animal restraint device. In some embodiments, a kit is disclosed herein comprising animal restraining apparatus 20 comprising foreleg constraining leash 22 and support strap 24 with collar C, leash L, or both collar C and leash L. In some embodiments, a kit is disclosed herein comprising animal restraining apparatus 20 comprising foreleg constraining leash 22 and support strap 24' and/or support strap 24" with body harness BH, leash L, or both body harness BH and leash L. In some embodiments, a kit is disclosed herein comprising animal restraining apparatus 20 comprising foreleg constraining leash 22 and support strap 24 with head muzzle M, leash L, or both head muzzle M and leash L. In some embodiments, a kit is disclosed herein comprising animal restraining apparatus 20 comprising foreleg constraining leash 22' with neck collar C, body harness BH, or head muzzle M. In some embodiments, a kit is disclosed herein comprising animal restraining apparatus 20 comprising foreleg constraining leash 22' and support strap 24 with neck collar C, and/or head muzzle M. In some embodiments, a kit is disclosed herein comprising animal restraining apparatus 20 comprising foreleg constraining leash 22' and support strap 24' and/or support strap 24" with body harness BH. In some embodiments, a kit is disclosed herein comprising animal restraining apparatus 20 comprising foreleg constraining leash 22 and support strap 24 comprising foreleg humerus loop 34' with leash L.

Aspects of the present specification may also be described by the following embodiments:

1. An animal restraining apparatus comprising a foreleg constraining leash, the foreleg constraining leash configured into a foreleg humerus loop; and a support strap coupled to the foreleg constraining leash; wherein, the support strap is configured to proximally position the foreleg humerus loop and to permit constriction or expansion of the foreleg humerus loop.
2. The animal restraining apparatus of embodiment 1, wherein the foreleg constraining leash has a leash end opposite a restraint end, the foreleg humerus loop located between the leash end and the restraint end.
3. The animal restraining apparatus of embodiment 1 or 2, further comprising a loop connector, the loop connector receiving therethrough the foreleg constraining leash to support the foreleg humerus loop and permit sliding of the foreleg constraining leash through the loop connector.
4. The animal restraining apparatus of any one of embodiments 1-3, wherein the support strap is coupled to the foreleg constraining leash through the loop connector.
5. The animal restraining apparatus of any one of embodiments 1-4, wherein the connector is a ring through which the foreleg constraining leash passes at least twice to form the foreleg humerus loop.
6. The animal restraining apparatus of any one of embodiments 1-5, wherein the support strap comprises an anchor point end opposite a constraining leash end, the anchor point end comprises an anchor connector comprising a second foreleg loop, the anchor connector configured to be proximally positioned and laterally opposite to the foreleg constraining leash when donned on the animal.
7. The animal restraining apparatus of any one of embodiments 1-6, wherein the support strap comprises an anchor point end opposite constraining leash end, the anchor point end comprising an anchor connector configured to connect to a support harness be proximally position to the foreleg humerus loop when donned on the animal.
8. The animal restraining apparatus of any one of embodiments 2-7, wherein the leash end includes a connector configured to connect to the foreleg constraining leash to a leash.
9. The animal restraining apparatus of any one of embodiments 2-8, wherein the leash end is a hand hold loop.
10. The animal restraining apparatus of any one of embodiments 2-9, wherein the restraint end connects to a neck collar or head muzzle
11. An animal restraining apparatus comprising a foreleg constraining leash, the foreleg constraining leash arranged in a first foreleg humerus loop; and a support strap coupled to the foreleg constraining leash; wherein the support strap is configured to proximally position the first foreleg humerus loop about a first foreleg of the animal above an elbow of the first foreleg with a top portion of the foreleg humerus loop positioned in a humerus/scapula region of the first foreleg and a bottom portion of the foreleg humerus loop nested beneath an axilla region of the first foreleg, wherein the foreleg constraining leash is configured to attach to a leash.

12. The animal restraining apparatus of embodiment 11, wherein the foreleg constraining leash having a leash end opposite a restraint end.

13. The animal restraining apparatus of embodiment 12, wherein, when in the donned configuration, the restraint end connects to a neck collar or head muzzle and the leash end connects to the leash.

14. The animal restraining apparatus of any one of embodiments 11-13, wherein when a force is applied to the foreleg constraining leash, the force is communicated through the first foreleg humerus loop.

15. The animal restraining apparatus of any one of embodiments 11-14, wherein further comprising a loop connector, the loop connector receiving therethrough the foreleg constraining leash to support the foreleg humerus loop and permit sliding of the foreleg constraining leash through the loop connector.

16. The animal restraining apparatus of any one of embodiments 11-15, wherein the support strap is coupled to the foreleg constraining leash through the loop connector.

17. The animal restraining apparatus of any one of embodiments 11-16, wherein the loop connector is a ring through which the foreleg constraining leash passes at least twice to form the foreleg humerus loop.

18. The animal restraining apparatus of any one of embodiments 11-17, wherein the support strap comprises an anchor point end opposite a constraining leash end, the anchor point end comprises an anchor connector comprising a second foreleg loop, the anchor connector configured to be proximally positioned and laterally opposite to the foreleg constraining leash when donned on the animal.

19. The animal restraining apparatus of any one of embodiments 11-18, wherein the support strap comprises an anchor end opposite a constraining leash end, the anchor point end comprising an anchor connector configured to connect to a support harness be proximally position to the foreleg humerus loop when donned on the animal.

20. An animal restraining apparatus comprising a foreleg constraining leash, the foreleg constraining leash having a leash end opposite a restraint end, the leash end comprising a leash connector configured to connect to a leash and the restraint end comprising a restraint connector configured to connect to an animal restraint device; and a support strap comprising a leash constraining end opposite an anchor point end, the leash constraining end comprising a loop connector and the anchor point end comprising an anchor connector; wherein the loop connector is configured to couple the foreleg constraining leash to the support strap in a manner that forms a foreleg humerus loop between the leash end and the restraint end of the foreleg constraining leash while allowing the foreleg constraining leash to freely slide through the loop connector to permit constriction or expansion of the foreleg humerus loop; and wherein the support strap is configured to secure the foreleg constraining leash on an animal in a manner that maintains a proximal position of the foreleg humerus loop high above the elbow of a first foreleg of the animal.

21. The animal restraint apparatus of embodiment 20, wherein the anchor point connector is configured to secure to a second foreleg of the animal.

22. The animal restraint apparatus of embodiment 20, wherein the anchor point connector is configured to secure to an animal restraint device comprising a body harness.

23. The animal restraint apparatus of embodiments 20 or 21, wherein the animal restraint device comprises a neck collar or a head muzzle.

24. A method of donning an animal restraining apparatus onto an animal, the method comprises a) inserting a first foreleg of the animal through a foreleg humerus loop of a foreleg constraining leash; b) inserting a second foreleg of the animal through an anchor connector comprising a foreleg anchor of a support strap; and c) securing a leash connector of the foreleg constraining leash to a leash; wherein the foreleg humerus loop and the anchor connector are configured so that the foreleg humerus loop is in a proximal position above an elbow of the first foreleg of the animal.

25. The method of donning an animal restraining apparatus of embodiment 24, further comprising the step of securing a restraint connector of the foreleg constraining leash to an animal restraint device.

26. A method of donning an animal restraining apparatus onto an animal, the method comprises a) providing the animal restraining apparatus comprising a foreleg constraining leash and a support strap coupled to the foreleg constraining leash, the foreleg constraining leash comprising a leash end comprising a leash connector opposite a restraint end comprising a restraint connector, and the foreleg constraining leash configured into a foreleg humerus loop between the leash end and the restraint end; b) inserting a first foreleg of the animal through the foreleg humerus loop of the foreleg constraining leash; b) inserting a second foreleg of the animal through an anchor connector comprising a foreleg anchor of the support strap; c) securing the restraint connector to an animal restraint device; and d) securing the leash connector to a leash; wherein the foreleg humerus loop and the anchor connector are configured so that the foreleg humerus loop is in a proximal position above an elbow of the first foreleg of the animal.

27. A method of donning an animal restraining apparatus onto an animal, the method comprises a) inserting a first foreleg of the animal through a foreleg humerus loop of a foreleg constraining leash; b) inserting a second foreleg of the animal through an anchor connector comprising a foreleg anchor of a support strap; and c) securing a restraint connector of the foreleg constraining leash to an animal restraint device; wherein the foreleg humerus loop and the anchor connector are configured so that the foreleg humerus loop is in a proximal position above an elbow of the first foreleg of the animal.

28. A method of donning an animal restraining apparatus onto an animal, the method comprises a) providing the animal restraining apparatus comprising a foreleg constraining leash and a support strap coupled to the foreleg constraining leash, the foreleg constraining leash comprising a leash opposite a restraint end comprising a restraint connector, and the foreleg constraining leash configured into a foreleg humerus loop between the leash end and the restraint end; b) inserting a first foreleg of the animal through a foreleg humerus loop of a foreleg constraining leash; c) inserting a second foreleg of the animal through an anchor connector comprising a foreleg anchor of a support strap; and d) securing a restraint connector of the foreleg constraining leash to an animal restraint device; wherein the foreleg humerus loop and the anchor connector are configured so that the foreleg humerus loop is in a proximal position above an elbow of the first foreleg of the animal.

29. A method of donning an animal restraining apparatus, the method comprises a) inserting a first foreleg of the animal through a foreleg humerus loop of a foreleg constraining leash; b) securing an anchor connector of a support strap to a first animal restraint device comprising a body harness; c) securing a restraint connector of the foreleg constraining leash to a second animal restraint device; and d) securing a leash connector of the foreleg constraining leash to a leash; wherein the foreleg humerus loop and the anchor connector are configured so that the foreleg humerus loop is in a proximal position above an elbow of the first foreleg of the animal.

30. A method of donning an animal restraining apparatus onto an animal, the method comprises a) providing the animal restraining apparatus comprising a foreleg constraining leash and a support strap coupled to the foreleg constraining leash, the foreleg constraining leash comprising a leash end comprising a leash connector opposite a restraint end comprising a restraint connector, and the foreleg constraining leash configured into a foreleg humerus loop between the leash end and the restraint end; a) inserting a first foreleg of the animal through the foreleg humerus loop of the foreleg constraining leash; b) securing an anchor connector of the support strap to a first animal restraint device comprising a body harness; c) securing the restraint connector of the foreleg constraining leash to a second animal restraint device; and d) securing the leash connector of the foreleg constraining leash to a leash; wherein the foreleg humerus loop and the anchor connector are configured so that the foreleg humerus loop is in a proximal position above an elbow of the first foreleg of the animal.

31. The method of any one of embodiments 24-28, wherein the animal restraint device comprises a neck collar or a head muzzle.

32. The method of embodiment 29 or 30, wherein the second animal restraint device comprises a neck collar or a head muzzle.

33. The method of any one of embodiments 24-32, wherein the proximal position above the elbow positions a top portion of the foreleg humerus loop in a humerus/scapula region of the first foreleg and a bottom portion of the foreleg humerus loop beneath an axilla region of the first foreleg.

34. A method of controlling movement of an animal, the method comprising a) providing an animal restraining apparatus comprising a foreleg constraining leash and a support strap coupled to the foreleg constraining leash, the foreleg constraining leash configured into a foreleg humerus loop; b) inserting a first foreleg of the animal into the foreleg humerus loop; and c) securing a leash to the foreleg constraining leash; wherein the support strap is configured to maintain the foreleg humerus loop is in a proximal position above an elbow of the first foreleg of the animal.

35. A method of controlling movement of an animal, the method comprising a) providing an animal restraining apparatus comprising a foreleg constraining leash and a support strap coupled to the foreleg constraining leash, the foreleg constraining leash comprising a leash end comprising a leash connector opposite a restraint end comprising a restraint connector, and the foreleg constraining leash configured into a foreleg humerus loop between the leash end and the restraint end; b) inserting a first foreleg of the animal into the foreleg humerus loop; c) securing the leash end to a leash; and d) securing the restraint end to an animal restraint device; wherein the support strap is configured to maintain the foreleg humerus loop is in a proximal position above an elbow of the first foreleg of the animal.

36. The method of embodiments 35 or 36 wherein the support strap comprises an anchor end opposite a constraining leash end, the anchor end comprising a connector comprising a second foreleg loop, the method further comprising inserting a second foreleg of the animal into the second foreleg loop.

37. A method of embodiment 35 or 36, wherein the animal restraint device comprises a neck collar or a head muzzle.

38. A method of controlling movement of an animal, the method comprising applying a force to a foreleg restraining leash of an animal restraining apparatus in a manner that causes a reduction in loop size of a foreleg humerus loop around a foreleg of the animal, wherein reduction in loop size of the foreleg humerus loop impedes the foreleg of the animal to freely move forward causing the animal to cease its movement.

39. A method of controlling movement of an animal, the method comprising a) providing an animal donned with an animal restraining apparatus, the animal restraining apparatus comprising a foreleg restraining leash and a support strap; and b) applying a force to the foreleg restraining leash in a manner that causes a reduction in loop size of a foreleg humerus loop around a foreleg of the animal, wherein reduction in loop size of the foreleg humerus loop impedes the foreleg of the animal to freely move forward causing the animal to cease its movement.

40. A method of controlling movement of an animal, the method comprising a) providing an animal donned with an animal restraining apparatus, the animal restraining apparatus comprising a foreleg restraining leash and a support strap, the foreleg constraining leash configured into a foreleg humerus loop; and b) applying a force to the foreleg restraining leash in a manner that causes a reduction in loop size of the foreleg humerus loop around a foreleg of the animal, wherein reduction in loop size of the foreleg humerus loop impedes the foreleg of the animal to freely move forward causing the animal to cease its movement.

41. A kit comprising an animal restraining apparatus of embodiments 1-19 and one or more animal restraint apparatuses.

42. The kit of embodiment 41, wherein the one or more animal restraint apparatuses comprise a neck collar, a body harness, a head muzzle, or any combination thereof.

In closing, foregoing descriptions of embodiments of the present invention have been presented for the purposes of illustration and description. It is to be understood that, although aspects of the present invention are highlighted by referring to specific embodiments, one skilled in the art will readily appreciate that these described embodiments are only illustrative of the principles comprising the present invention and such examples are not limiting thereto. As such, the specific embodiments are not intended to be exhaustive or to limit the invention to the precise forms disclosed. The use of any and all examples or exemplary language (e.g., "such as") provided herein is intended merely to better illuminate the present invention and does not pose a limitation on the scope of the invention otherwise claimed. No language in the present specification should be construed as indicating any non-claimed element essential to the practice of the invention. In addition, all methods described herein can be performed in any suitable order unless otherwise indicated herein or otherwise clearly contradicted by context. Therefore, it should be understood that embodiments of the disclosed subject matter are in no way limited to a particular element, compound, composition, component, article, apparatus, methodology, use, protocol, step, and/or limitation described herein, unless expressly stated as such.

In addition, groupings of alternative embodiments, elements, steps and/or limitations of the present invention are not to be construed as limitations. Each such grouping may be referred to and claimed individually or in any combination with other groupings disclosed herein. It is anticipated that one or more alternative embodiments, elements, steps and/or limitations of a grouping may be included in, or deleted from, the grouping for reasons of convenience and/or patentability. When any such inclusion or deletion occurs, the specification is deemed to contain the grouping as modified, thus fulfilling the written description of all Markush groups used in the appended claims.

Furthermore, those of ordinary skill in the art will recognize that certain changes, modifications, permutations, alterations, additions, subtractions, and sub-combinations thereof can be made in accordance with the teachings herein without departing from the spirit of the present invention. Furthermore, it is intended that the following appended claims and claims hereafter introduced are interpreted to include all such changes, modifications, permutations, alterations, additions, subtractions, and sub-combinations as are within their true spirit and scope. Accordingly, the scope of the present invention is not to be limited to that precisely as shown and described by this specification.

Certain embodiments of the present invention are described herein, including the best mode known to the inventors for conducting the invention. Of course, variations on these described embodiments will become apparent to those of ordinary skill in the art upon reading the foregoing description. The inventor expects skilled artisans to employ such variations as appropriate, and the inventors intend for the present invention to be practiced otherwise than specifically described herein. Accordingly, this invention includes all modifications and equivalents of the subject matter recited in the claims appended hereto as permitted by applicable law. Moreover, any combination of the above-described embodiments in all possible variations thereof is encompassed by the invention unless otherwise indicated herein or otherwise clearly contradicted by context.

The words, language, and terminology used in this specification is for the purpose of describing particular embodiments, elements, steps and/or limitations only and is not intended to limit the scope of the present invention, which is defined solely by the claims. In addition, such words, language, and terminology are to be understood not only in the sense of their commonly defined meanings, but to include by special definition in this specification structure, material or acts beyond the scope of the commonly defined meanings. Thus, if an element, step or limitation can be understood in the context of this specification as including more than one meaning, then its use in a claim must be understood as being generic to all possible meanings supported by the specification and by the word itself.

The definitions and meanings of the elements, steps or limitations recited in a claim set forth below are, therefore, defined in this specification to include not only the combination of elements, steps or limitations which are literally set forth, but all equivalent structure, material or acts for performing substantially the same function in substantially the same way to obtain substantially the same result. In this sense it is therefore contemplated that an equivalent substitution of two or more elements, steps and/or limitations may be made for any one of the elements, steps or limitations in a claim set forth below or that a single element, step, or limitation may be substituted for two or more elements, steps and/or limitations in such a claim. Although elements, steps or limitations may be described above as acting in certain combinations and even initially claimed as such, it is to be expressly understood that one or more elements, steps and/or limitations from a claimed combination can in some cases be excised from the combination and that the claimed combination may be directed to a sub-combination or variation of a sub-combination. As such, notwithstanding the fact that the elements, steps and/or limitations of a claim are set forth below in a certain combination, it must be expressly understood that the invention includes other combinations of fewer, more, or different elements, steps and/or limitations, which are disclosed in above combination even when not initially claimed in such combinations. Furthermore, insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements. Accordingly, the claims are thus to be understood to include what is specifically illustrated and described above, what is conceptually equivalent, what can be obviously substituted and also what essentially incorporates the essential idea of the invention.

Unless otherwise indicated, all numbers expressing a characteristic, item, quantity, parameter, property, term, and so forth used in the present specification and claims are to be understood as being modified in all instances by the term "about." As used herein, the term "about" means that the characteristic, item, quantity, parameter, property, or term so qualified encompasses a range of plus or minus ten percent above and below the value of the stated characteristic, item, quantity, parameter, property, or term. Accordingly, unless indicated to the contrary, the numerical parameters set forth in the specification and attached claims are approximations that may vary. For instance, as mass spectrometry instruments can vary slightly in determining the mass of a given analyte, the term "about" in the context of the mass of an ion or the mass/charge ratio of an ion refers to +/−0.50 atomic mass unit. At the very least, and not as an attempt to limit the application of the doctrine of equivalents to the scope of the claims, each numerical indication should at least be construed in light of the number of reported significant digits and by applying ordinary rounding techniques.

Notwithstanding that the numerical ranges and values setting forth the broad scope of the invention are approximations, the numerical ranges and values set forth in the specific examples are reported as precisely as possible. Any numerical range or value, however, inherently contains certain errors necessarily resulting from the standard deviation found in their respective testing measurements. Unless the context dictates the contrary, all ranges set forth herein should be interpreted as being inclusive of their endpoints and open-ended ranges should be interpreted to include only commercially practical values. Recitation of numerical ranges of values herein is merely intended to serve as a shorthand method of referring individually to each separate numerical value falling within the range. Unless otherwise indicated herein, each individual value of a numerical range is incorporated into the present specification as if it were individually recited herein. Similarly, all lists of values should be considered as inclusive of intermediate values unless the context indicates the contrary.

Use of the terms "may" or "can" in reference to an embodiment or aspect of an embodiment also carries with it the alternative meaning of "may not" or "cannot." As such, if the present specification discloses that an embodiment or an aspect of an embodiment may be or can be included as part of the inventive subject matter, then the negative limitation or exclusionary proviso is also explicitly meant, meaning that an embodiment or an aspect of an embodiment may not be or cannot be included as part of the inventive subject matter. In a comparable manner, use of the term "optionally" in reference to an embodiment or aspect of an embodiment means that such embodiment or aspect of the embodiment may be included as part of the inventive subject matter or may not be included as part of the inventive subject matter. Whether such a negative limitation or exclusionary proviso applies will be based on whether the negative limitation or exclusionary proviso is recited in the claimed subject matter.

The terms "a," "an," "the" and similar references used in the context of describing the present invention (especially in the context of the following claims) are to be construed to cover both the singular and the plural, unless otherwise indicated herein or clearly contradicted by context. Further, ordinal indicators—such as, e.g., "first," "second," "third," etc.—for identified elements are used to distinguish between the elements, and do not indicate or imply a required or limited number of such elements, and do not indicate a particular position or order of such elements unless otherwise specifically stated.

When used in the claims, whether as filed or added per amendment, the open-ended transitional term "comprising", variations thereof such as, e.g., "comprise" and "comprises", and equivalent open-ended transitional phrases thereof like "including", "containing" and "having", encompass all the expressly recited elements, limitations, steps, integers, and/or features alone or in combination with unrecited subject matter; the named elements, limitations, steps, integers, and/or features are essential, but other unnamed elements, limitations, steps, integers, and/or features may be added and still form a construct within the scope of the claim. Specific embodiments disclosed herein may be further limited in the claims using the closed-ended transitional phrases "consisting of" or "consisting essentially of" (or variations thereof such as, e.g., "consist of", "consists of", "consist essentially of", and "consists essentially of") in lieu of or as an amendment for "comprising." When used in the claims, whether as filed or added per amendment, the closed-ended transitional phrase "consisting of" excludes any element, limitation, step, integer, or feature not expressly recited in the claims. The closed-ended transitional phrase "consisting essentially of" limits the scope of a claim to the expressly recited elements, limitations, steps, integers, and/or features and any other elements, limitations, steps, integers, and/or features that do not materially affect the basic and novel characteristic(s) of the claimed subject matter. Thus, the meaning of the open-ended transitional phrase "comprising" is being defined as encompassing all the specifically recited elements, limitations, steps and/or features as well as any optional, additional unspecified ones. The meaning of the closed-ended transitional phrase "consisting of" is being defined as only including those elements, limitations, steps, integers, and/or features specifically recited in the claim, whereas the meaning of the closed-ended transitional phrase "consisting essentially of" is being defined as only including those elements, limitations, steps, integers, and/or features specifically recited in the claim and those elements, limitations, steps, integers, and/or features that do not materially affect the basic and novel characteristic(s) of the claimed subject matter. Therefore, the open-ended transitional phrase "comprising" (and equivalent open-ended transitional phrases thereof) includes within its meaning, as a limiting case, claimed subject matter specified by the closed-ended transitional phrases "consisting of" or "consisting essentially of." As such, the embodiments described herein or so claimed with the phrase "comprising" expressly and unambiguously provide description, enablement, and support for the phrases "consisting essentially of" and "consisting of."

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

Finally, all patents, patent publications, and other references cited and identified in the present specification are individually and expressly incorporated herein by reference in their entirety to the same extent as if each individual publication or patent application were specifically and individually indicated to be incorporated by reference. These publications are provided solely for their disclosure prior to the filing date of the present application. The reference to any prior art in this specification is not, and should not be taken as, an acknowledgement or any form of suggestion that the prior art forms part of the common general knowledge from any country. In addition, where a definition or use of a term in an incorporated reference is inconsistent or contrary to the definition of that term provided herein, the definition of that term provided herein applies and the definition of that term in the reference does not apply. Lastly, nothing in this regard is or should be construed as an admission that the inventors are not entitled to antedate such disclosure by virtue of prior invention or for any other reason. All statements as to the date or representation as to the contents of these documents are based on the informa-

The invention claimed is:

1. An animal restraining apparatus comprising:
a foreleg constraining leash having a leash end opposite a restraint end, the restraint end having a restraint connector; and
a support strap comprising a constraining leash end opposite an anchor point end, the constraining leash end comprising a loop connector and the anchor point end comprising an anchor connector;
wherein the foreleg constraining leash is coupled to the loop connector of the support strap by an overhand or underhand loop of the foreleg constraining leash, the overhand or underhand loop forming a foreleg humerus loop between the leash end and the restraint end of the foreleg constraining leash with each of the leash end and the restraint end of the foreleg constraining leash extending through the loop connector in opposing directions, the foreleg constraining leash being permitted to slide through the loop connector to permit constriction or expansion of the foreleg humerus loop;
wherein the support strap is configured to secure the foreleg constraining leash on an animal in a manner that maintains a proximal position of the foreleg humerus loop above an elbow of a first foreleg of the animal at least when constricted.

2. The animal restraint apparatus of claim 1, wherein the restraint end having a restraint connector configured to connect to an animal restraint device, the tension additionally causes the restraint end of the foreleg constraining leash move toward the loop connector.

3. The animal restraint apparatus of claim 2, wherein the animal restraint device includes a collar or a head muzzle.

4. The animal restraint apparatus of claim 1, wherein the anchor connector is configured to secure to a second foreleg of the animal or an animal restraint device comprising a body harness.

5. An animal restraining apparatus comprising:
a foreleg constraining leash, the foreleg constraining leash comprising a leash end and a restraint end, and the restraint end having a restraint connector; and
a support strap having foreleg loop opposite a loop connector and a dorsal traversing portion therebetween;
wherein the foreleg constraining leash is coupled to the loop connector by an overhand or underhand loop of the foreleg constraining leash, with each of the leash end and the restraint end of the foreleg constraining leash extending through the loop connector in opposing directions, the overhand or underhand loop forming the foreleg humerus loop; and
wherein the support strap is configured to proximally position the foreleg humerus loop and to permit constriction of the foreleg humerus loop in response to a caudally directed tension force applied directly through the loop connector applied on the leash end of the foreleg constraining leash.

6. The animal restraining apparatus of claim 5, wherein an anchor connector is configured to be proximally positioned and laterally opposite to the foreleg constraining leash when donned on the animal.

7. The animal restraining apparatus of claim 5, wherein the leash end includes a leash connector configured to connect the foreleg constraining leash to a leash.

8. An animal restraining apparatus comprising:
a foreleg constraining leash, having a leash end opposite a restraint end, the restraint end having a restraint connector; and
a support strap having a foreleg loop opposite a loop connector and a dorsal traversing portion therebetween,
wherein the foreleg constraining leash is coupled to the loop connector by an overhand or underhand loop of the foreleg constraining leash, the overhand or underhand loop forming a foreleg humerus loop between the leash end and the restraint end of the foreleg constraining leash with each of the leash end and the restraint end of the foreleg constraining leash extending through the loop connector in opposing directions of each other;
wherein the foreleg humerus loop is configured to constrict in response to a caudally directed tension force applied directly through the loop connector through the leash end of the foreleg constraining leash which further causes the leash end of the foreleg constraining leash to move away from the loop connector and the restraint end of the foreleg constraining leash move toward the loop connector;
wherein, when in a donned configuration, the support strap is configured to proximally positions the foreleg humerus loop about a first foreleg of an animal above an elbow of the first foreleg with a top portion of the foreleg humerus loop positioned in a humerus/scapula region of the first foreleg and a bottom portion of the foreleg humerus loop nested beneath an axilla region of the first foreleg; and
wherein, when in the donned configuration, the restraint end connects to a collar or head muzzle.

9. The animal restraining apparatus of claim 8, wherein the foreleg loop is configured to be proximally positioned and laterally opposite to the foreleg constraining leash when donned on the animal.

10. A kit comprising an animal restraining apparatus as defined in claim 1 and one or more animal restraint devices.

11. A method of controlling movement of an animal, the method comprising applying the tension force in a caudal direction to a foreleg restraining leash of an animal restraining apparatus as defined in claim 1 in a manner that causes a reduction in loop size of a foreleg humerus loop around a foreleg of the animal, wherein reduction in loop size of the foreleg humerus loop impedes the foreleg of the animal to freely move forward causing the animal to cease its movement.

12. The animal restraining apparatus of claim 1, wherein constriction of the foreleg humerus loop impedes upward lifting of the first foreleg to create an off-balanced, three-legged stance in the animal causing the animal to cease forward movement in order to maintain stability.

13. The animal restraining apparatus of claim 5, wherein constriction of the foreleg humerus loop impedes upward lifting of the first foreleg to create an off-balanced, three-legged stance in the animal causing the animal to cease forward movement in order to maintain stability.

14. The animal restraining apparatus of claim 8, wherein constriction of the foreleg humerus loop impedes upward lifting of the first foreleg to create an off-balanced, three-legged stance in the animal causing the animal to cease forward movement in order to maintain stability.

15. The kit of claim 10, wherein the one or more animal restraint devices is a collar, a body harness, or a head muzzle.

16. The method of claim 11, wherein constriction of the foreleg humerus loop impedes upward lifting of the first foreleg to create an off-balanced, three-legged stance in the animal causing the animal to cease forward movement in order to maintain stability.

* * * * *